(12) United States Patent
Capati et al.

(10) Patent No.: US 11,276,904 B2
(45) Date of Patent: *Mar. 15, 2022

(54) ELECTRIC VEHICLE BATTERY CURRENT COLLECTOR

(71) Applicant: CHONGQING JINKANG POWERTRAIN NEW ENERGY CO., LTD., Chongqing (CN)

(72) Inventors: Nathalie Capati, Santa Clara, CA (US); Duanyang Wang, Santa Clara, CA (US); Jacob Heth, Santa Clara, CA (US); Binbin Chi, Santa Clara, CA (US)

(73) Assignee: CHONGQING JINKANG POWERTRAIN NEW ENERGY CO., LTD., Chongqing (CN)

( * ) Notice: Subject to any disclaimer, the term of this patent is extended or adjusted under 35 U.S.C. 154(b) by 18 days.

This patent is subject to a terminal disclaimer.

(21) Appl. No.: 16/859,553

(22) Filed: Apr. 27, 2020

(65) Prior Publication Data

US 2020/0259153 A1 Aug. 13, 2020

Related U.S. Application Data

(63) Continuation of application No. 16/118,359, filed on Aug. 30, 2018, now Pat. No. 10,680,228.

(Continued)

(51) Int. Cl.
*H01M 50/502* (2021.01)
*H01M 10/04* (2006.01)
(Continued)

(52) U.S. Cl.
CPC ........... *H01M 50/502* (2021.01); *H01M 4/78* (2013.01); *H01M 10/0422* (2013.01);
(Continued)

(58) Field of Classification Search
CPC ........ H01M 4/70; H01M 2/206; H01M 2/105; H01M 2/1077; H01M 2/26; H01M 2220/20

See application file for complete search history.

(56) References Cited

U.S. PATENT DOCUMENTS

2007/0009787 A1* 1/2007 Straubel ................ H01M 2/105
429/99
2011/0206978 A1* 8/2011 Muis ...................... H01M 2/206
429/158

(Continued)

FOREIGN PATENT DOCUMENTS

JP 2013038055 A * 2/2013 .......... H01M 2/0242

*Primary Examiner* — Matthew J Merkling
(74) *Attorney, Agent, or Firm* — Cooper Legal Group, LLC

(57) ABSTRACT

Systems and methods for a battery pack to power an electric vehicle are provided. The battery pack can include a plurality of battery modules having a plurality of battery blocks. The battery blocks can include a plurality of cylindrical battery cells. A first current collector can include a conductive layer to couple the first current collector with positive terminals of the plurality of cylindrical battery cells. A second current collector can include a conductive layer to couple the second current collector with negative terminals of the plurality of cylindrical battery cells. The first current collector, second current collector, and an isolation layer can include a plurality of apertures to expose the positive terminals of the plurality of cylindrical battery cells. The positive terminals can extend through the plurality of apertures to couple with the conductive layer of the first current collector.

6 Claims, 11 Drawing Sheets

Related U.S. Application Data

(60) Provisional application No. 62/557,680, filed on Sep. 12, 2017.

(51) Int. Cl.
  *H01M 4/78* (2006.01)
  *H01M 50/20* (2021.01)
  *H01M 50/116* (2021.01)
  *H01M 50/543* (2021.01)

(52) U.S. Cl.
  CPC ..... *H01M 10/0431* (2013.01); *H01M 50/116* (2021.01); *H01M 50/20* (2021.01); *H01M 50/543* (2021.01); *H01M 2220/20* (2013.01)

(56) References Cited

U.S. PATENT DOCUMENTS

| | | | |
|---|---|---|---|
| 2012/0231309 A1* | 9/2012 | Itoi | H01M 2/1077 429/99 |
| 2016/0181579 A1* | 6/2016 | Geshi | H01M 2/206 429/61 |
| 2019/0081364 A1* | 3/2019 | Capati | H01M 10/425 |
| 2019/0097190 A1* | 3/2019 | Seol | H01M 2/204 |
| 2019/0109356 A1* | 4/2019 | Kaga | H01M 2/10 |
| 2019/0207184 A1* | 7/2019 | Koutari | H01M 2/26 |
| 2019/0221814 A1* | 7/2019 | Shimizu | H01M 2/10 |
| 2019/0305262 A1* | 10/2019 | Nakasawa | H01M 2/20 |
| 2019/0312251 A1* | 10/2019 | Matthews | H01M 2/204 |

* cited by examiner

ELECTRIC VEHICLE BATTERY CURRENT COLLECTOR

CROSS REFERENCE TO RELATED APPLICATION

The present application claims the benefit of priority under 35 U.S.C. § 120 as a continuation of U.S. patent application Ser. No. 16/118,359, titled "ELECTRIC VEHICLE BATTERY CURRENT COLLECTOR", filed Aug. 30, 2018, which claims the benefit of priority under 35 U.S.C. § 119(e) to U.S. Provisional Application 62/557,680, titled "CURRENT COLLECTOR DESIGN", filed on Sep. 12, 2017. The entire disclosure of both are incorporated herein by reference in their entirety.

BACKGROUND

Vehicles such as automobiles can include power sources. The power sources can power motors or other systems of the vehicles.

SUMMARY

In at least one aspect, a system to power electric vehicles is provided. The system can include a battery pack to power an electric vehicle. The battery pack can reside in the electric vehicle and include a plurality of battery modules. Each of the plurality of battery modules can include a plurality of battery blocks. A first battery block of the plurality of battery blocks can include a pair of battery block terminals. The first battery block can include a plurality of cylindrical battery cells. Each of the plurality of cylindrical battery cells can include a positive terminal and a negative terminal. A first current collector can include a conductive layer. The conductive layer of the first current collector can couple the first current collector with positive terminals of the plurality of cylindrical battery cells at first ends of the plurality of cylindrical battery cells. A second current collector can include a conductive layer. The conductive layer of the second current collector can be electrically isolated from the conductive layer of the first current collector by an isolation layer. The conductive layer of the second current collector can couple the second current collector with negative terminals of the plurality of cylindrical battery cells at the first ends of the plurality of cylindrical battery cells. The first current collector can include a plurality of apertures to expose the positive terminals of the plurality of cylindrical battery cells to couple with the conductive layer of the first current collector. The isolation layer can include a plurality of apertures to expose the positive terminals of the plurality of cylindrical battery cells. The positive terminals of the plurality of cylindrical battery cells can extend through the plurality of apertures of the isolation layer to couple with the conductive layer of the first current collector. The second current collector can have a plurality of apertures to expose the positive terminals of the plurality of cylindrical battery cells and to expose portions of the negative terminals of the plurality of cylindrical battery cells to connect to the conductive layer of the second current collector. The positive terminals of the plurality of cylindrical battery cells can extend through the plurality of apertures of the second current collector to couple with the conductive layer of the first current collector.

In another aspect, a method of providing a system to power an electric vehicle is provided. The method can include providing a battery pack to power an electric vehicle. The battery pack can reside in the electric vehicle and can include a plurality of battery modules. Each of the plurality of battery modules can include a plurality of battery blocks. A first battery block of the plurality of battery blocks can include a pair of battery block terminals. The method can include disposing a plurality of cylindrical battery cells in the first battery block. Each of the cylindrical battery cells can include a positive terminal and a negative terminal. The method can include aligning a plurality of apertures of a first current collector having a conductive layer. The plurality of apertures of the first current collector can be aligned to expose positive terminals of the plurality of cylindrical battery cells to couple with the conductive layer of the first current collector. The method can include aligning a plurality of apertures of an isolation layer. The plurality of apertures of the isolation layer can be aligned to expose the positive terminals. The positive terminals of the plurality of cylindrical battery cells can extend through the plurality of apertures of the isolation layer to couple with the conductive layer of the first current collector. The method can include aligning a plurality of apertures of a second current collector having a conductive layer. The plurality of apertures of the second current collector can be aligned to expose the positive terminals of the plurality of cylindrical battery cells to couple with the conductive layer of the first current collector. The plurality of apertures of the second current collector can be aligned to expose portions of the negative terminals of the plurality of cylindrical battery cells to connect to the conductive layer of the second current collector. The method can include connecting the first current collector to the positive terminals of the plurality of cylindrical battery cells at first ends of the plurality of cylindrical battery cells. The method can include connecting the second current collector to negative terminals of the plurality of cylindrical battery cells at the first ends of the plurality of cylindrical battery cells.

In another aspect, a method is provided. The method can include providing a system to power electric vehicles. The system can include a battery pack to power an electric vehicle. The battery pack can reside in the electric vehicle and include a plurality of battery modules. Each of the plurality of battery modules can include a plurality of battery blocks. A first battery block of the plurality of battery blocks can include a pair of battery block terminals. The first battery block can include a plurality of cylindrical battery cells. Each of the plurality of cylindrical battery cells can include a positive terminal and a negative terminal. A first current collector can include a conductive layer. The conductive layer of the first current collector can couple the first current collector with positive terminals of the plurality of cylindrical battery cells at first ends of the plurality of cylindrical battery cells. A second current collector can include a conductive layer. The conductive layer of the second current collector can be electrically isolated from the conductive layer of the first current collector by an isolation layer. The conductive layer of the second current collector can couple the second current collector with negative terminals of the plurality of cylindrical battery cells at the first ends of the plurality of cylindrical battery cells. The first current collector can include a plurality of apertures to expose the positive terminals of the plurality of cylindrical battery cells to couple with the conductive layer of the first current collector. The isolation layer can include a plurality of apertures to expose the positive terminals of the plurality of cylindrical battery cells. The positive terminals of the plurality of cylindrical battery cells can extend through the plurality of apertures of the isolation layer to couple with the conductive layer of the first current collector. The second current collector can have a plurality of apertures to expose the positive terminals of the plurality of cylindrical battery cells and to expose portions of the negative terminals of the plurality of cylindrical battery cells to connect to the conductive layer of the second current collector. The positive terminals of the plurality of cylindrical battery cells can extend through the plurality of apertures of the second current collector to couple with the conductive layer of the first current collector.

In another aspect, an electric vehicle is provided. The electric vehicle can include a battery pack to power an electric vehicle. The battery pack can reside in the electric vehicle and include a plurality of battery modules. Each of the plurality of battery modules can include a plurality of battery blocks. A first battery block of the plurality of battery blocks can include a pair of battery block terminals. The first battery block can include a plurality of cylindrical battery cells. Each of the plurality of cylindrical battery cells can include a positive terminal and a negative terminal. A first current collector can include a conductive layer. The conductive layer of the first current collector can couple the first current collector with positive terminals of the plurality of cylindrical battery cells at first ends of the plurality of cylindrical battery cells. A second current collector can include a conductive layer. The conductive layer of the second current collector can be electrically isolated from the conductive layer of the first current collector by an isolation layer. The conductive layer of the second current collector can couple the second current collector with negative terminals of the plurality of cylindrical battery cells at the first ends of the plurality of cylindrical battery cells. The first current collector can include a plurality of apertures to expose the positive terminals of the plurality of cylindrical battery cells to couple with the conductive layer of the first current collector. The isolation layer can include a plurality of apertures to expose the positive terminals of the plurality of cylindrical battery cells. The positive terminals of the plurality of cylindrical battery cells can extend through the plurality of apertures of the isolation layer to couple with the conductive layer of the first current collector. The second current collector can have a plurality of apertures to expose the positive terminals of the plurality of cylindrical battery cells and to expose portions of the negative terminals of the plurality of cylindrical battery cells to connect to the conductive layer of the second current collector. The positive terminals of the plurality of cylindrical battery cells can extend through the plurality of apertures of the second current collector to couple with the conductive layer of the first current collector.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not necessarily intended to be drawn to scale. Like reference numbers and designations in the various drawings indicate like elements. For purposes of clarity, not every component may be labelled in every drawing. In the drawings.

DETAILED DESCRIPTION

Following below are more detailed descriptions of various concepts related to, and implementations of, methods, apparatuses, devices, and systems for providing a system to power electric vehicles having one or more current collectors is provided. The various concepts introduced above and discussed in greater detail below may be implemented in any of numerous ways.

With reference to the FIGS., the systems, methods, devices, and apparatuses of the present disclosure relate generally to battery related energy storage devices, including but not limited to battery blocks and battery packs to power electric vehicles. There is an increasing demand for higher capacity battery cells for higher power, higher voltage battery packs, to support applications in plug-in hybrid electrical vehicles (PHEVs), hybrid electrical vehicles (HEVs), electrical vehicle (EV) systems, or stationary energy storage, for example. Challenges with increasing the capacity at the battery cell level include packaging efficiency.

The present disclosure is directed to systems and methods for providing systems to power electric vehicles. The systems can include a battery pack to power an electric vehicle. The battery packs having a layered current collector formed from conductive and nonconductive structures to provide current collectors for battery cells. For example, the battery pack can include one or more battery modules, and each of the battery modules can include one or more battery blocks. Each of the battery blocks can include a plurality of battery cells. Each of the plurality of battery cells can have a voltage of up to 5 volts (or other limit) across terminals of the corresponding battery cell. The battery block can include an arrangement of the plurality of battery cells electrically connected in parallel. Each cell of the plurality of battery cells can be spatially separated from each of at least one adjacent cell by, for example, two millimeter (mm) or less. The battery cells can be homogeneous or heterogeneous in one or more aspects, such as height, shape, voltage, energy capacity, location of terminal(s) and so on. The battery cells of a battery block can be coupled with the layered current collector (e.g., stacked current collector) to power electric an vehicle. The current collector configuration as described herein can support positive and negative connections at a top portion of the battery cells such that positive and negative terminals couple with the same end of the battery cells for ease of assembly.

Figure 1:
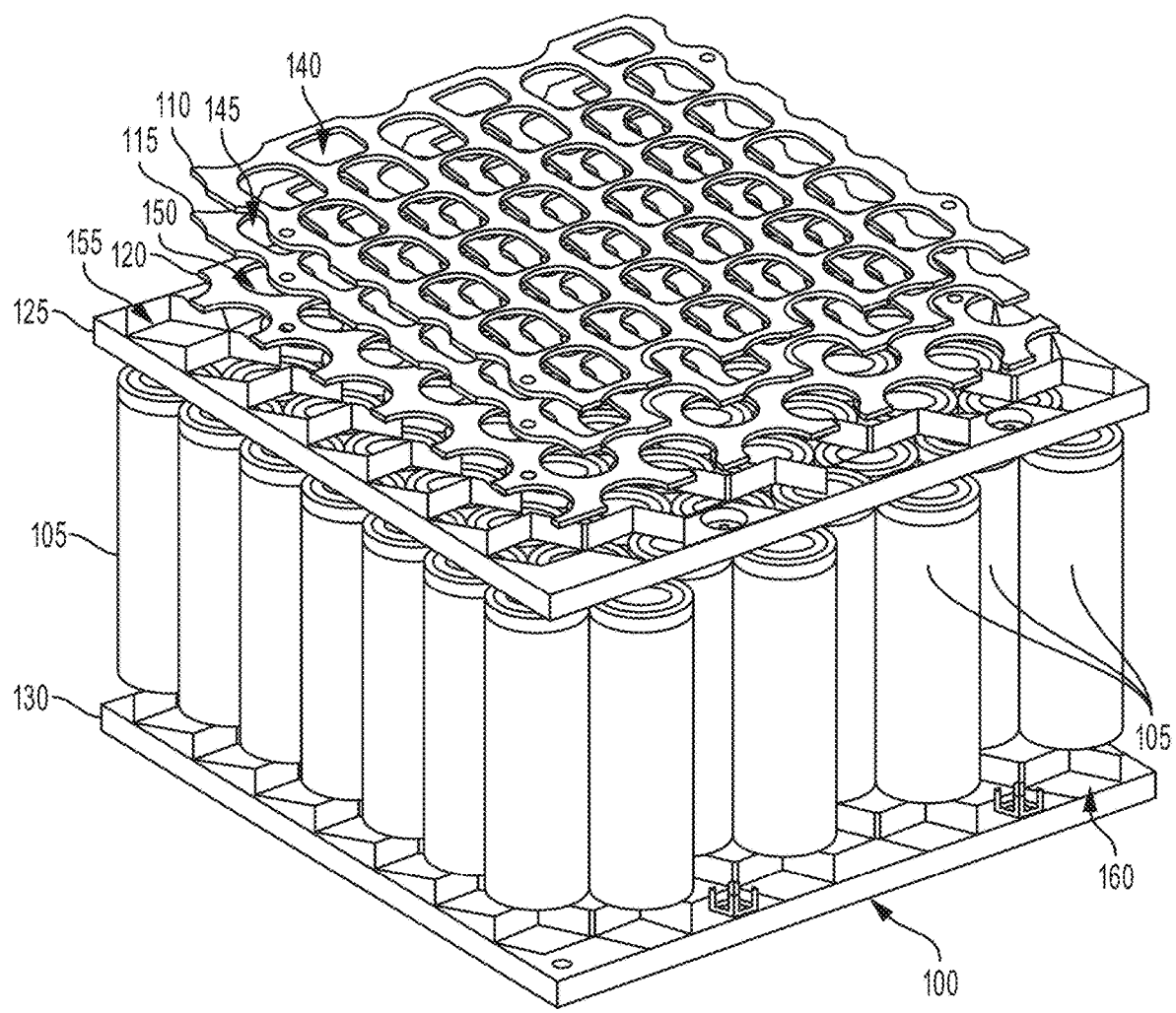
FIG. 1 depicts an exploded view of an illustrative embodiment of a system to power an electric vehicle.

FIG. 1, among others, depicts a partially exploded view of an example of a battery block 100. The battery block 100 can include a plurality of battery cells 105 disposed between a first cell holder 125 and a second cell holder 130. The first cell holder 125 and the second cell holder 130 can house, support, hold, positon, or arrange the battery cells 105 to form the battery block 100 and may be referred to herein as structural layers. For example, the first cell holder 125 and the second cell holder 130 can hold the battery cells 105 in predetermined positions or in a predetermined arrangement to provide appropriate spacing or separation between each of the battery cells 105.

The first cell holder 125 can include a plurality of layers (e.g., conductive layers, non-conductive layers) that couple the plurality of battery cells 105 with each other. The first cell holder 125 can include alternating or interleaving layers of conductive layers and non-conductive layers. For example, the first cell holder 125 may include a positive conductive layer 110, an isolation layer 115 having a non-conductive material, and a negative conductive layer 120. The first cell holder 125 can include, be coupled with or house the plurality of layers to provide current collectors for the plurality of battery cells 105. For example, and as depicted in FIG. 1, the first cell holder 125 can include, be coupled with or house a first current collector 110 (e.g., positive current collector), an isolation layer 115 (e.g., non-conductive layer), and a second current collector 120 (e.g., negative current collector). FIG. 1 depicts a second surface (e.g., bottom surface) of the first current collector 110 disposed over, coupled with, or in contact with a first surface (e.g., top surface) of the isolation layer 115. A second surface (e.g., bottom surface) of the isolation layer 115 is disposed over, coupled with, or in contact with a first surface (e.g., top surface) of the second current collector 120. A second surface (e.g., bottom surface) of the second current collector 120 is disposed over, coupled with, or in contact with a first surface (e.g., top surface) of the first cell holder 125.

The battery cells 105 of a battery block can couple with the multi-layered current collector (e.g., stacked current collector) the having a first current collector 110 (e.g., positive current collector) and the second current collector 120 (e.g., negative current collector) separated by an isolation layer 115 (e.g., insulation material, nonconductive material). For example, the battery cells 105 can have a negative portion (e.g., negative can, negative housing) and a positive portion (e.g., positive tab on cell lid) and the coupling strategy for coupling the negative and positive portions to current collectors can be difficult. A multi-layered current collector, as described herein, can include multiple layers to couple with the negative portion and the positive portion of each of the battery cells 105 and from a common end (e.g., top end, bottom end) of the battery cells 105. For example, a top end (or first end) of each of the battery cells 105 may include a rim or lid having a positive portion. A negative portion and tabs from a first current collector 110 and a second current collector 120 of the multi-layered current collector can couple with the positive portion and the negative portion of the rim or lid, respectively.

The multi-layered current collector can include the positive (or first) current collector 110 comprising a first conductive layer, and a negative (or second) current collector 120 comprising a second conductive layer, that can be laminated together using an isolation layer 115 that is disposed between the positive current collector 110 and the negative current collector 120. The isolation layer 115 can hold or bind the positive current collector 110 and negative current collector 120 together. The isolation layer 115 can include or use adhesive(s) or other binding material(s) or mechanism(s) to hold or bind the positive current collector 110 and negative current collector 120 together. The isolation layer 115, the positive current collector 110 and the negative current collector can be held or bound together to form a multi-layer composite, sometimes collectively referred as a multi-layered current collector. A lamination material or lamination coating can be disposed over each of the layers as a conformal coating to protect against a short circuit condition from the positive and negative current collectors 110, 120. Apertures can be formed in each of the layers to expose the weld areas of terminals of the battery cells 105 when the multi-layered current collector is coupled with or disposed over the plurality of battery cells 105. Negative tabs can couple the negative current collectors 120 to the battery cells 105, using techniques, such as but not limited to, laser welding or wire bonding. Positive tabs can couple the positive current collectors 110 to the battery cells 105 in some implementations, using techniques, such as but not limited to, laser welding or wire bonding.

In an example multi-layered current collector, a bottom layer can include the negative current collector 120. The negative current collector 120 can include a conductive material, such as but not limited to a metal (e.g., copper, aluminum), or a metallic material. The negative current collector 120 can have a thickness in a range from 1 mm to 8 mm, (e.g., a value less than 5 mm). The negative current collector 120 can be coupled with or disposed on a cell holder. The negative current collector 120 can include a plurality of apertures 150 to receive or engage a rim portion (or cap portion, or other portion) of each of the plurality of battery cells 105 such that a negative tab portion of each of the plurality of apertures 150 couples with or contacts at least two battery cells 105. The negative tab can be part of or welded or wire bonded to the negative current collector 120. The negative tab can be welded or wire bonded to the negative terminals of the battery cells 105. The multi-layered current collector can include resistive welding in which a bondhead can couple with or contact the negative current collector 120 directly and weld to the rim of the battery cell 105 to form the negative connection.

In an example multi-layered current collector, a middle layer can include the isolation layer 115 and a top layer may include the positive current collector 110. The positive current collector 110 can include a conductive material, such as but not limited to copper or aluminum and can have a thickness in a range from 1 mm to 8 mm (e.g., less than 5 mm). The positive current collector 110 can include a plurality of apertures 140 to receive or engage a positive tab that extends though apertures of one or more layers of the multi-layered current collector and couples with a positive terminal (e.g., positive cap area) of a battery cell 105. The positive tab can be welded or wire bonded to the positive current collector 110 and the positive terminal of the battery cell 105.

Cell holders 125, 130 can hold or maintain battery cells 105 in a spatial arrangement with respect to one another. The cell holders 125, 130 can provide spatial separation between adjacent battery cells 105 of less than 1 mm (or less than 1.2 mm, or less than 2 mm, or other predetermined values or ranges). Adjacent battery cells 105 can refer to closest neighbor battery cell 105 pairs. Spatial separation may be uniform across adjacent battery cell 105 pairs or may vary across certain groups of battery cell 105 pairs. The arrangement of battery cells 105 within the battery block 100, including the spatial separation between adjacent battery cells 105, can provide a volumetric energy density that is higher than that of single battery cell implementations. The spatial separation between adjacent battery cells 105 can allow for suitable or sufficient thermal dissipation between battery cells 105, avoidance of electrical arcing between battery cells 105, and possibly other protective features. The cell holders 125, 130 can incorporate structures, such as channels or routing vents, to receive, direct or release high energy or high pressure gaseous release. The channels or routing vents can receive gaseous release through vents incorporated in the battery cells 105, for instance by coupling to these vents. The cell holders 125, 130 can include material that is suitably thermally conductive, to transfer, propagate and dissipate heat resulting from the battery cells 105.

Figure 7:
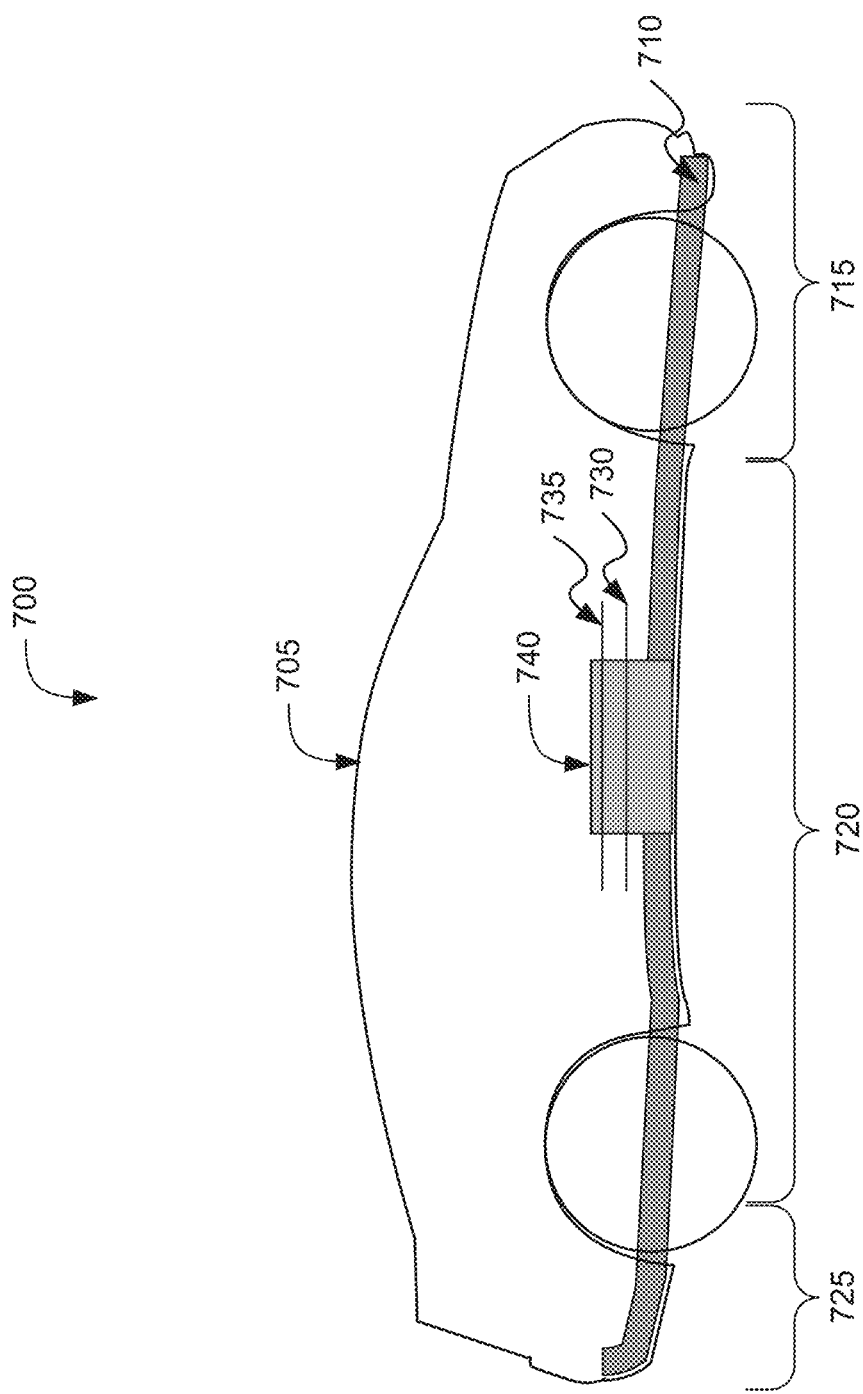
FIG. 7 is a block diagram depicting a cross-sectional view of an example electric vehicle installed with a battery pack.

The material and structural configuration of the cell holders 125, 130 can provide spatial separation between cells such that creepage or clearance (creepage-clearance) requirements are met or exceeded for supporting a certain voltage (e.g., 400V or 450V, among other voltages) across terminals of a battery pack such as battery pack 740 as in FIG. 7 or of a battery module 500 (e.g., 60 V) that is implemented using the battery blocks 100. Creepage can refer to a separation (e.g., shortest distance) between connection or weld points (e.g., between like-terminals) of battery cells 105 as measured along a surface of a bus-bar, circuit board or other connecting structure. Clearance can refer to a separation (e.g., shortest distance) between connection or weld points between (e.g., like-terminals of) battery cells 105 as measured through air or space.

The busbar and the current collector can be referred to interchangeably herein. A busbar can include, geometrically or functionally, a strip or bar that carries current. A current collector can have a structure that is not geometrically a strip or bar, that carries current. A busbar or a current collector can include a conductive piece of metal that is electrically connected to battery cells (e.g., terminals of the battery cells) and that carries current.

A battery cell 105 can be cylindrical in shape or structure. The battery cell 105 can have one cap or two caps, including a top cap. The top cap can include, incorporate or hold a tab or conductive structure located within or at a center of the top cap, which forms a positive electrical terminal of the battery cell 105. The battery cell 105 can have a metallic or conductive can or housing. The housing may operate as the main casing for the battery cell. The can or housing can include a surface structure that forms a negative electrical terminal of the battery cell. The housing can extend over the cylindrical or curved surface of the battery cell, and can extend over one end of the battery cell. FIG. 1 shows multiple ones of an example embodiment of a cylindrical battery cell 105.

Battery cells 105 can include cylindrical, prismatic can, or polymer pouch formats. Cylindrical cells can be used in low voltage applications, small format devices (e.g., power tools). The battery block described herein can include cylindrical battery cells 105 packaged into a prismatic format for increased utility in larger battery modules. For example, each of the cylindrical battery cells 105 can have the same shape and dimensions. The cylindrical battery cells 105 can be arranged within a battery block in a predetermined order such that the individual cylindrical battery cells 105 can be individually replaced or additional cylindrical battery cells can be added to increase the capacity of the respective battery block. The battery blocks 100 can have the same shape and dimensions and can be combined with one or more different battery blocks to form a battery module or a battery pack.

The battery block design described herein can increase yield rate and improve system reliability. If one battery cell 105 were to fail in a battery block 100, it does not compromise the entire block 100. Certain battery cells 105 can be replaced in a battery block 100 to make up for any lost capacity. For example, a monolithic battery cell 105 may be rendered inoperable if any portion of the battery cell 105 is to fail. For example, if a 50 Ampere-hour (Ah) battery block 100 containing ten (10) 5 Ah battery cells 105 has an individual battery cell 105 that has failed, the battery block 100 then becomes 45 Ah, and the battery pack system would only see a loss of 5 Ah. The cylindrical battery cells 105 can provide a battery block capacity to store energy that is at least five times greater than a battery cell capacity of each of the plurality of cylindrical battery cells, and the battery blocks 100 can have a voltage of up to 5 volts across the pair of battery block terminals of the respective battery blocks 100.

The first cell holder 125 can hold, house or align the first current collector 110, the isolation layer 115, and the second current collector 120. For example, the first cell holder 125 can include a border or raised edge formed around a border of the first cell holder 125 such that the first current collector 110, the isolation layer 115, and the second current collector 120 can be disposed within the border or raised edge. The plurality of battery cells 105 can be disposed or positioned between a second surface (e.g., bottom surface) of the first cell holder 125 and a first surface (e.g., top surface) of the second cell holder 130. The first cell holder 125 and the second cell holder 130 can hold, house or align the plurality of battery cells 105 using a plurality of apertures.

For example, the first current collector 110, the isolation layer 115, the second current collector 120, the first cell holder 125, and the second cell holder 130 can include a plurality of apertures. The first current collector 110 can include a first plurality of apertures 140 having a first shape. The isolation layer 115 can include a second plurality of apertures 145 having a second shape. The second current collector 120 can include a third plurality of apertures 150 having a third shape. The first cell holder 125 can include a fourth plurality of apertures 155 having a fourth shape. The second cell holder 130 can include a fifth plurality of apertures 160 having a fifth shape. The apertures 140, 145, 150, 155, 160 can include an opening or hole formed through each of the respective layers, or a recess formed into the respective layers.

The shape, dimensions, or geometry of one or more of the first plurality of apertures 140, the second plurality of apertures 145, the third plurality of apertures 150, the fourth plurality of apertures 155, and the fifth plurality of apertures 160 can be different. For example, the first plurality of apertures 140 can be formed having a circular shape and the second plurality of apertures 145 can be formed having a rectangular shape. The shape, dimensions, or geometry of one or more of the first plurality of apertures 140, the second plurality of apertures 145, the third plurality of apertures 150, the fourth plurality of apertures 155, and the fifth plurality of apertures 160 can be the same or similar. For example, each of the plurality of apertures 140, 145, 150, 155, 160 can be formed having a circular shape. The shape, dimensions, or geometry of the apertures 140, 145, 150, 155, 160 can be selected according to an arrangement or separation of the battery cells 105. The shape, dimensions, or geometry of the apertures 140, 145, 150, 155, 160 can be selected based at least in part on the shape, dimensions, or geometry of the battery cells 105. For example, the plurality of battery cells 105 can be disposed or positioned between a second surface (e.g., bottom surface) of the first cell holder 125 and a first surface (e.g., top surface) of the second cell holder 130. The first cell holder 125 can hold, house or align the plurality of battery cells 105 using the fourth plurality of apertures 155 and the second cell holder 130 can hold, house or align the plurality of battery cells 105 using the fifth plurality of apertures 160. The battery cells 105 can include a rim portion 135 that is formed at, disposed at, or coupled with a first end or top end of each of the battery cells 105. The rim portion 135 of each battery cell 105 can be disposed in, coupled with, or in contact with at least (an edge, boundary, side, surface or structure of) one aperture of the fourth plurality of apertures 155 of the first cell holder 125. Each of the battery cells 105 can be disposed within the battery block 100 such that a second end or bottom end of a battery cell 105 is disposed in, coupled with or in contact with at least (an edge, boundary, side, surface or structure of) one aperture of the fifth plurality of apertures 160 formed in the second cell holder 130.

The apertures 140, 145, 150 of the first current collector 110, the isolation layer 115, and the second current collector 120 can allow a connection to a positive current collector (e.g., first current collector 110) or negative current collector (e.g., second current collector 120) from each of the battery cells 105. For example, a wirebond can extend through the apertures 140, 145, 150 to couple a positive terminal or surface of a battery cell 105 with the first current collector 110. Thus, the apertures 140, 145, 150 can be sized to have a diameter or opening that is greater than a diameter or cross-sectional shape of the wirebond. A negative tab can extend from the second current collector 120 and be connected to negative surfaces or terminals on at least two battery cells 105. For example, a wirebond can extend from the negative tab to couple with a portion of a negative terminal on a battery cell 105 that is exposed by the aperture 150. Thus, one or more of the apertures 140, 145, 150 can be sized to have dimensions that are greater than the dimensions of the negative tab, or greater than a diameter or cross-sectional shape of the wirebond. The shape of the apertures 140, 145, 150, 155, 160 can include a round, rectangular, square, or octagon shape as some examples. The dimensions of the apertures 140, 145, 150, 155, 160 can include a width of 21 mm for instance.

The apertures 140, 145, 150 can be formed such that they are smaller than the apertures 155, 160. For example, the apertures 155 and 160 can have a diameter in a range from 10 mm to 35 mm (e.g., 18 mm to 22 mm). The apertures 140, 145, 150 can have a diameter in a range from 3 mm to 33 mm. If the apertures 155, 160 are formed having a square or rectangular shape, the apertures 155, 160 can have a length in a range of 4 mm to 25 mm (e.g., 10 mm). If the apertures 155, 160 are formed having a square or rectangular shape, the apertures 155, 160 can have a width in a range from 4 mm to 25 mm (e.g., 10 mm). For example, the apertures 155, 160 can have dimensions of 10 mm×10 mm. If the apertures 140, 145, 150 are formed having a square or rectangular shape, the apertures 140, 145, 150 can have a length in a range from 2 mm to 20 mm (e.g., 7 mm). If the apertures 140, 145, 150 are formed having a square or rectangular shape, the apertures 140, 145, 150 can have a width in a range from 2 mm to 20 mm (e.g., 7 mm). For example, the apertures 140, 145, 150 can have dimensions of 7 mm×7 mm.

Apertures 145 can be formed such that they are smaller (e.g., have smaller dimensions) or offset with respect to apertures 140. For example, apertures 145 can correspond to apertures 140, such as having the same geometric shape with just an offset to make the apertures 145 smaller with respect to apertures 140. For example, the offset can be in a range from 0.1 mm to 6 mm depending on isolation, creepage, and clearance requirements. Apertures 145 can be sized the same as or identical to aperture 140.

The apertures 140, 145, 150 can be formed in a variety of shapes. For example, the apertures 140, 145, 150 may not be formed as distinct patterned openings or formed having distinct patterned openings. For example, the apertures 140, 145, 150 can be formed as a geometric cut from the sides of the respective one of layers 110, 115, 120. The apertures 140, 145, 150 can be formed as half circular cutouts around the perimeter of each of the respective one of layers 110, 115, 120, respectively.

The first current collector 110 and the second current collector 120 can include conductive material, a metal (e.g., copper, aluminum), or a metallic material. The first current collector 110 can be a positive current collector layer or positively charged current collector. The second current collector 120 can be a negative current collector layer or negatively charged current collector. The first current collector 110 and the second current collector 120 can have a thickness in a range of 1 mm to 8 mm (e.g., 1.5 mm) for example. The first current collector 110 and the second current collector 120 can have the same length as battery block 100. The first current collector 110 and the second current collector 120 can have the same width as battery block 100.

The isolation layer 115 can include insulation material, plastic material, epoxy material, FR-4 material, polypropylene materials, or formex materials. The dimensions or geometry of the isolation layer 115 can be selected to provide a predetermined creepage clearance or spacing (sometimes referred to as creepage-clearance specification or requirement) between the first current collector 110 and the second current collector 120. For example, a thickness or width of the isolation layer 115 can be selected such that the first current collector 110 is spaced at least 3 mm from the second current collector 120 when the isolation layer 115 is disposed between the first current collector 110 and the second current collector 120. The isolation layer 115 can be formed having a shape or geometry that provides the predetermined creepage, clearance or spacing. For example, the isolation layer 115 can have a different dimension (e.g., length or width) than that the first current collector 110 and the second current collector 120 such that an end or edge portion of the isolation layer 115 extends out farther (e.g., longer) than an end or edge portion of the first current collector 110 and the second current collector 120 relative to a horizontal plane or a vertical plane. The distance that an end or edge portion of the isolation layer 115 extends out can provide the predetermined creepage clearance or spacing (e.g., 3 mm creepage or clearance). The thickness and insulating structure of the isolation layer 115, that separate the first current collector 110 and the second current collector 120, can provide the predetermined creepage, clearance or spacing. Thus, the dimensions of the isolation layer 115 can be selected, based in part, to meet creepage-clearance specifications or requirements. The dimensions of the isolation layer 115 can reduce or eliminate arcing between the first current collector 110 and the second current collector 120. For example, the isolation layer 115 can extend out farther than an end or edge portion of the first current collector 110 and the second current collector 120 relative to a horizontal plane or a vertical plane to space the first current collector 110 and the second current collector 120 from each other. The isolation layer 115 can have a thickness that ranges from 0.1 mm to 8 mm (e.g., 1 mm). The isolation layer 115 can have the same width as the battery block 100. For example, the isolation layer 115 can have a width in a range from 25 mm to 700 mm (e.g., 330 mm). The isolation layer 115 can have the same length as the battery block 100. For example, the isolation layer 115 can have a length in a range from 25 mm to 700 mm (e.g., 150 mm).

The material and structural configuration of the cell holders 125, 130 can provide spatial separation between cells such that creepage or clearance (creepage-clearance) requirements are met or exceeded for supporting a certain voltage across terminals of a battery pack (e.g., 400 V, or 450 V) or of a battery module 500 (e.g., 60 V) that is implemented using the battery blocks 100. Creepage can refer to a separation (e.g., shortest distance) between connection or weld points between (e.g., like-terminals of) battery cells 105 as measured along a surface of a bus-bar, circuit board or other connecting structure. Clearance can refer to a separation (e.g., shortest distance) between connection or weld points between (e.g., like-terminals of) battery cells 105 as measured through air or space.

The first cell holder 125 and the second cell holder 130 can include plastic material, acrylonitrile butadiene styrene (ABS) material, polycarbonate material, or nylon material (e.g., PA66 nylon) with glass fill for instance. The rigidity of first cell holder 125 and the second cell holder 130 can correspond to the material properties forming the respective first cell holder 125 and the second cell holder 130, such as flexural modulus. The first cell holder 125 and the second cell holder 130 can have a flame resistance rating (e.g., FR rating) of UL 94 rating of V-0 or greater. For example, the UL 94 V-0 rating can correspond to a wall thickness of the first cell holder 125 or the second cell holder 130. The thinner the wall thickness the more difficult it can be to achieve a V-0 rating. Thus, the first cell holder 125 or the second cell holder 130 can have a thickness in a range between 0.5 mm to 2.5 mm. The thickness of the first cell holder 125 or the second cell holder 130 can vary within or outside this range.

The first cell holder 125 and the second cell holder 130 can have a dielectric strength ranging from 250V/mil to 350V/mil. For example, the first cell holder 125 and the second cell holder 130 can have a dielectric strength of 300V/mil (other values or ranges of the values are possible). The first cell holder 125 and the second cell holder 130 can have a tensile strength ranging from 8,000 psi to 10,000 psi. For example, the first cell holder 125 and the second cell holder 130 can have a tensile strength of 9,000 psi (other values or ranges of the values are possible). The first cell holder 125 and the second cell holder 130 can have a flexural modulus (e.g., stiffness/flexibility) ranging from 350,000 psi to 450,000 psi. For example, the first cell holder 125 and the second cell holder 130 can have a flexural modulus (e.g., stiffness/flexibility) of 400,000 psi (other values or ranges of the values are possible). The values for the dielectric strength, tensile strength, or flexural modulus can vary outside these values or range of values and can be selected based in part on a particular application of the first cell holder 125 and the second cell holder 130.

Figure 5:
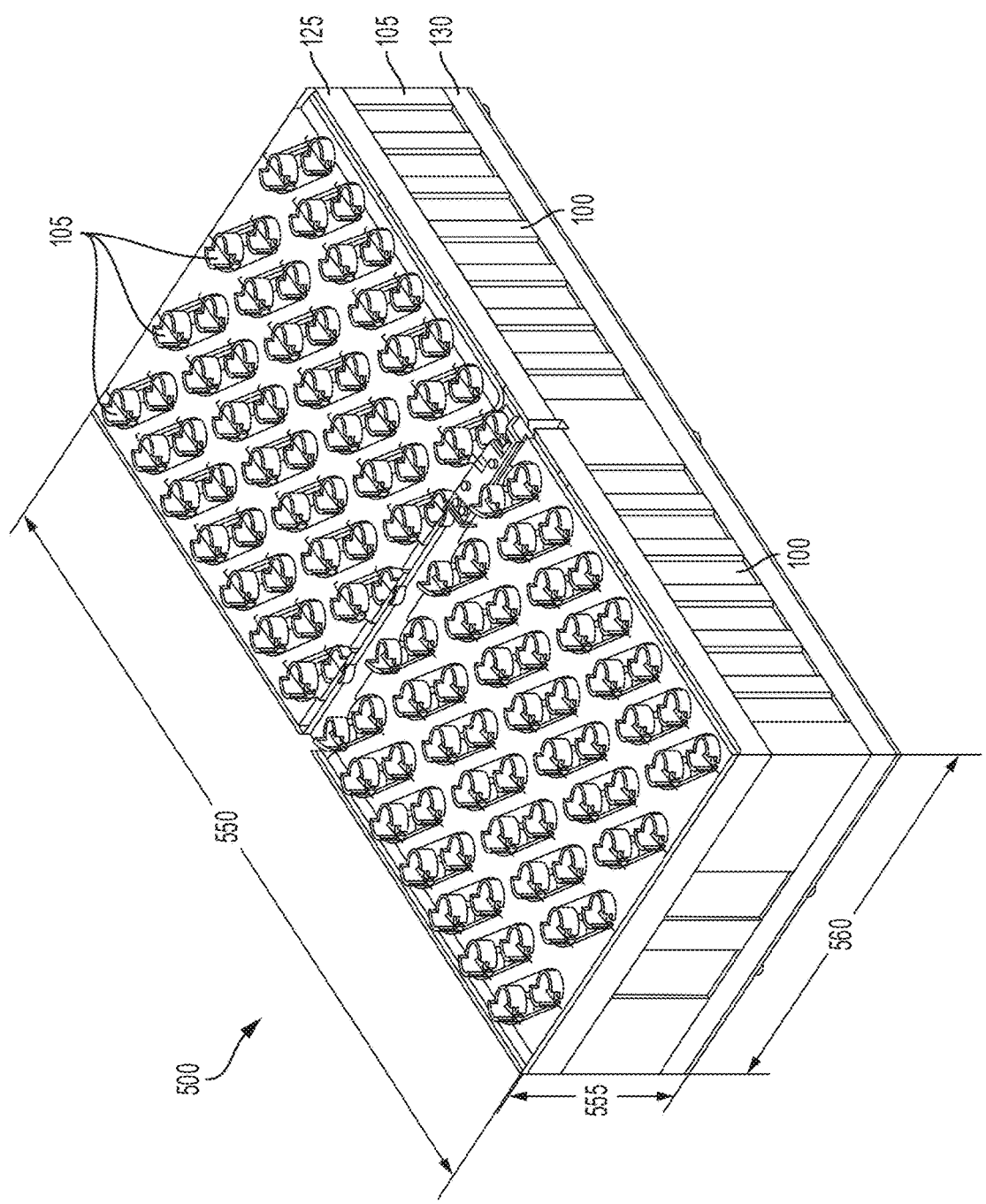
FIG. 5 depicts an isometric view of an illustrative embodiment of a system to power an electric vehicle.

The first current collector 110, the isolation layer 115, the second current collector 120, the first cell holder 125, and the second cell holder 130 can be components of a battery block, battery module, or battery pack (e.g., battery module 500 of FIG. 5). One or more of the first current collector 110, the isolation layer 115, the second current collector 120, the first cell holder 125, and the second cell holder 130 (e.g., including cut-outs or apertures of any of the corresponding layer) can be used to spatially hold or align each battery cell 105 in place relative to other battery cells 105, to at least meet creepage-clearance requirements of the corresponding battery pack (e.g., to provide a voltage of at least 400 volts or other value, across terminals of the corresponding battery pack) and the corresponding battery module (e.g., to provide a voltage of at least 50 volts or other value, across terminals of the corresponding battery module).

A single battery block 100 can include a fixed number of battery cells 105 wired in parallel ("p" count) and have the same voltage with that of the battery cell 105, and "p" times the discharge amps. A single battery block 100 can be wired in parallel with one or more battery blocks 100 to make a larger "p" battery block 100 for higher current applications, or wired in series as a module/unit to increase voltage. Additionally, a battery block 100 can be packaged into varying applications and can meet various standard battery sizes as defined by regulating bodies (e.g., Society of Automotive Engineers (SAE), United Nations Economic Commission for Europe (UNECE), German Institute for Standardization (DIN)) for different industries, countries, or applications.

A battery block 100 that is standardized or modularized into a building block or unit, can be combined or arranged with other battery blocks 100 to form a battery module (or battery pack) that can power any device or application, e.g., PHEV, HEV, EV, automotive, low voltage 12 volt system, 24 volt system, or 48 volt system, 400 volt system, 800 volt system, 1 kilovolt system, motorcycle/small light duty applications, enterprise (e.g., large or commercial) energy storage solutions, or residential (e.g., small or home) storage solutions, among others.

The battery components described herein can be standardized or modularized at the battery block level rather than at the battery module level. For example, each of the battery cells 105 can be formed having the same shape and dimensions. Each of the battery blocks 100 can be formed having the same shape and dimensions. Battery modules can be formed having the same or different shape and dimensions. Thus, battery cells 105 can be individually replaced or additional battery cells 105 can be added to increase the capacity of the respective battery block 100. Battery blocks 100 can be individually replaced or additional battery blocks 100 can be added to increase the capacity of the respective battery module. For example, the plurality battery modules can have a battery module capacity greater than the battery block capacity. Each of the plurality of battery modules can have a battery module voltage greater than the voltage across the battery block terminals of the first battery block. Battery modules can be individually replaced or additional battery modules can be added to increase the capacity of the respective battery pack. In some applications or embodiments, standardization or modularization at the battery module level can be implemented instead of, or in addition to that at the battery block level.

For example, consider the above example of a 5V/300 Ah battery block. For comparative purposes, current single battery cells of 5V/50 Ah technologies can be 0.03 cubic feet and six of these single cell batteries connected in parallel would make this 0.18 cubic feet in size. This is multiple times larger than a corresponding battery block disclosed herein (e.g., 0.05 cubic feet). Thus, other single cell technologies offer no volumetric advantage, and instead provide an increased hazard or failure risk.

The battery modules or battery blocks 100 disclosed herein can overcome packaging constraints, and can meet various performance targets using the same voltage of each component battery cell (0-5V) but with "p" times the discharge amps (e.g., discharge amps multiplied by the number of cells connected in parallel in the battery block). The battery modules (e.g., battery module 500 of FIG. 5) or battery blocks 100 can be formed into battery packs of various size, power and energy to meet different product performance requirements with the best packing efficiency and volumetric energy density that matches a specific design.

A battery block 100 can allow flexibility in the design of a battery module (e.g., battery module 500 of FIG. 5) or a battery pack (e.g., battery pack 740 of FIG. 7) with initially unknown space constraints and changing performance targets. Standardizing and using battery blocks 100 (which are each smaller in size than a battery module) can decrease the number of parts (e.g., as compared with using individual cells) which can decrease costs for manufacturing and assembly. A standardized battery module, on the other hand, can limit the types of applications it can support due to its comparatively larger size and higher voltage. Standardizing battery modules with nonstandard blocks can increase the number of parts which can increase costs for manufacturing and assembly. In comparison, a battery block 100 as disclosed herein can provide a modular, stable, high capacity or high power device, such as a battery module (e.g., battery module 500 of FIG. 5) or battery pack (e.g., battery pack 740 of FIG. 7), that is not available in today's market, and can be an ideal power source that can be packaged into various applications.

Figure 2:
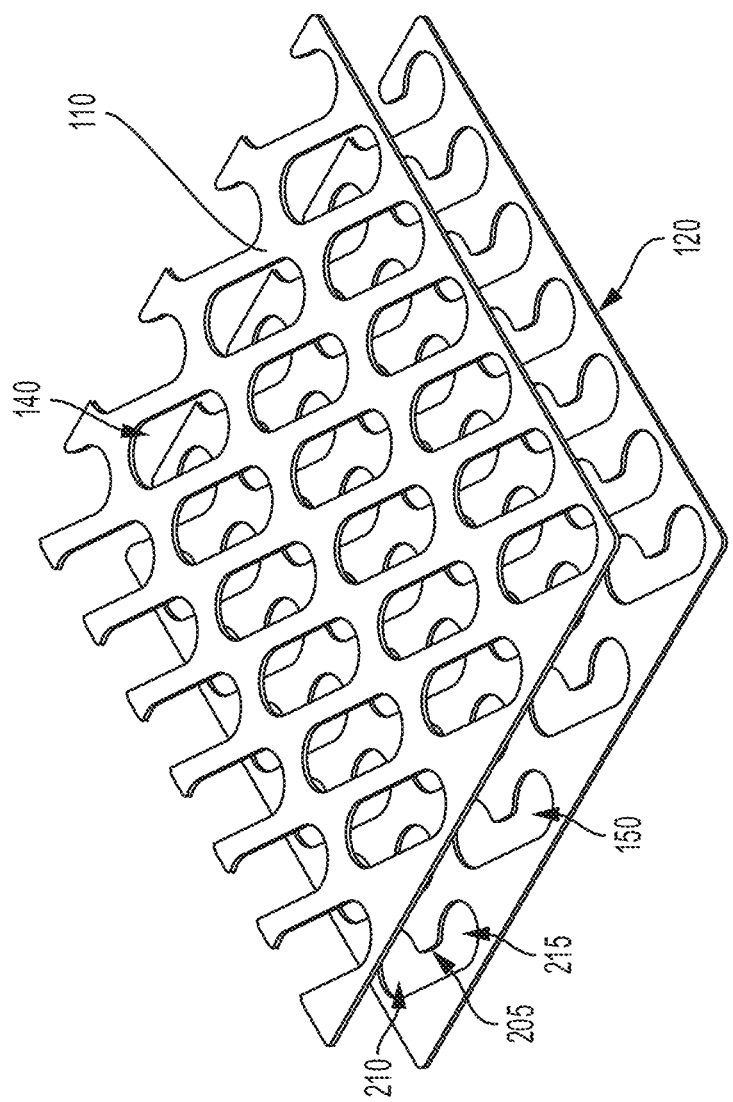
FIG. 2 depicts an exploded view of an illustrative embodiment of a system to power an electric vehicle.

FIG. 2, among others, depicts an exploded view with the first current collector 110 and the second current collector 120. In brief overview, FIG. 2 shows a portion of the stacked configuration of layers described in FIG. 1, that corresponds to the first current collector 110 and the second current collector 120. The first current collector 110 can include a first conductive layer that can be electrically isolated from the second current collector 120 by the isolation layer 115. The second current collector 120 can include a second conductive layer that can connect to the rim 135 (around a top cap) of each of the plurality of battery cells 105. The top cap's rim 135 can include, provide or serve as a negative terminal of the plurality of battery cells 105.

The first current conductor 110 can couple with or connect to positive terminals of the plurality of battery cells 105. Each of the positive terminals can be located at a same end of a corresponding battery cell 105 as a top cap rim 135 of the corresponding battery cell 105. Each of the first current collector 110, the second current collector 120, and the isolation layer 115 can have a plurality of apertures 140, 145, 150 configured to expose the positive terminals of the plurality of battery cells 105 through the respective layers. Portions of all or some of the apertures 140, 145, 150 are configured to conform at least in part to a shape or structure of the top cap rim 135 and the positive terminal of a battery cell 105. Each aperture 140, 145, 150 can align with two battery cells 105, two top cap rims 135, and two positive terminals, for example.

The first current collector 110 can include the first plurality of apertures 140 and the second current collector 120 can include the third plurality of apertures 150. The first plurality of apertures 140 can have a first shape and the third plurality of apertures 150 can have a second, different shape. The first plurality of apertures 140 and the third plurality of apertures 150 can be formed having a shape or geometry configured to allow the battery cells 105 to couple with or connect from their respective surfaces to the first current collector 110 and the second current collector 120. For example, the first current collector 110 can operate as a positive current collector layer and the second current collector 120 can operate as a positive current collector layer. Each of the battery cells 105 can be coupled with the positive first current collector 110 through a positive tab and coupled with the second current collector 120 through a negative tab.

For example, a wirebond (e.g., positive wirebond 605 of FIG. 6) can extend from a positive surface or positive portion of each of the battery cells through the third plurality of apertures 150 and the second plurality of apertures 145 (as shown in FIG. 1) to couple with a second surface (e.g., bottom surface, side surface) or portion of the first current collector 110, or a positive tab can extend from a positive surface or positive portion (or positive terminal) of each of the battery cells 105 through the third plurality of apertures 150, the second plurality of apertures 145 (as shown in FIG. 1), and the first plurality of apertures 140 to couple with a first surface (e.g., top surface, side surface) or portion of the first current collector 110. The third plurality of apertures 150, the second plurality of apertures 145, and the first plurality of apertures 140 can include an insulation material or insulation layer disposed around or covering the edge or side surfaces of each of their respective apertures to insulate or electrically isolate the positive tab from the respective layer (e.g., second current collector 120, first current collector 110). The third plurality of apertures 150, the second plurality of apertures 145, and the first plurality of apertures 140 can be sized, shaped, or formed to allow for each of the battery cells 105 to couple with the first current collector 110.

The negative tab 205 can be formed as part of or coupled with an edge or side surface of apertures of the third plurality of apertures 150. For example, each of the apertures 150 of the second current collector 120 can include a negative tab 205 that extends out to contact a negative surface or portion (or terminal) of one or more battery cells 105. The dimensions, shape, or geometry of the negative tab 205 can be selected such that each negative tab 205 can couple with or contact negative surfaces of at least two battery cells 105. The apertures 150 of the second current collector 120 can include a first region 210 and a second region 215. For example, the first region 210 and the second region 215 together can form an aperture 150 of the second current collector 120. The first region 210 and the second region 215 can correspond to two portions of a continuous open region forming an aperture 150 of the second current collector 120. The first region 210 and the second region 215 can be formed having a variety of different dimensions, shapes, or geometry. For example, the first region 210 and the second region 215 can be formed having, but not limited to, a round shape, circular shape, square shape, or rectangular shape.

The apertures 150 of the second current collector can include two regions 210, 215 to receive accept or receive a top portion of a battery cell 105. For example, the negative tab 205 can be disposed or positioned between the first region 210 and the second region 215 such that it is coupled with (e.g., electrically coupled) or in contact with portions of a first battery cell 105 coupled with the first region 210 and coupled with (e.g., electrically coupled) or in contact with portions of a second battery cell 105 coupled with the second region 215. A first battery cell 105 can be disposed within the first region 210 and the second battery cell 105 can be disposed within the second region 215. The first region 210 and the second region 215 can couple with or contact a rim or top portion the respective battery cells 105. For example, the first region 210 and the second region 215 can align the rim or top portions of the respective battery cells 105 such that the negative tab 205 contacts at least one surface (e.g., side surface, top surface) of the respective battery cells 105 to couple the battery cells 105 with the second current collector 120.

Figure 3:
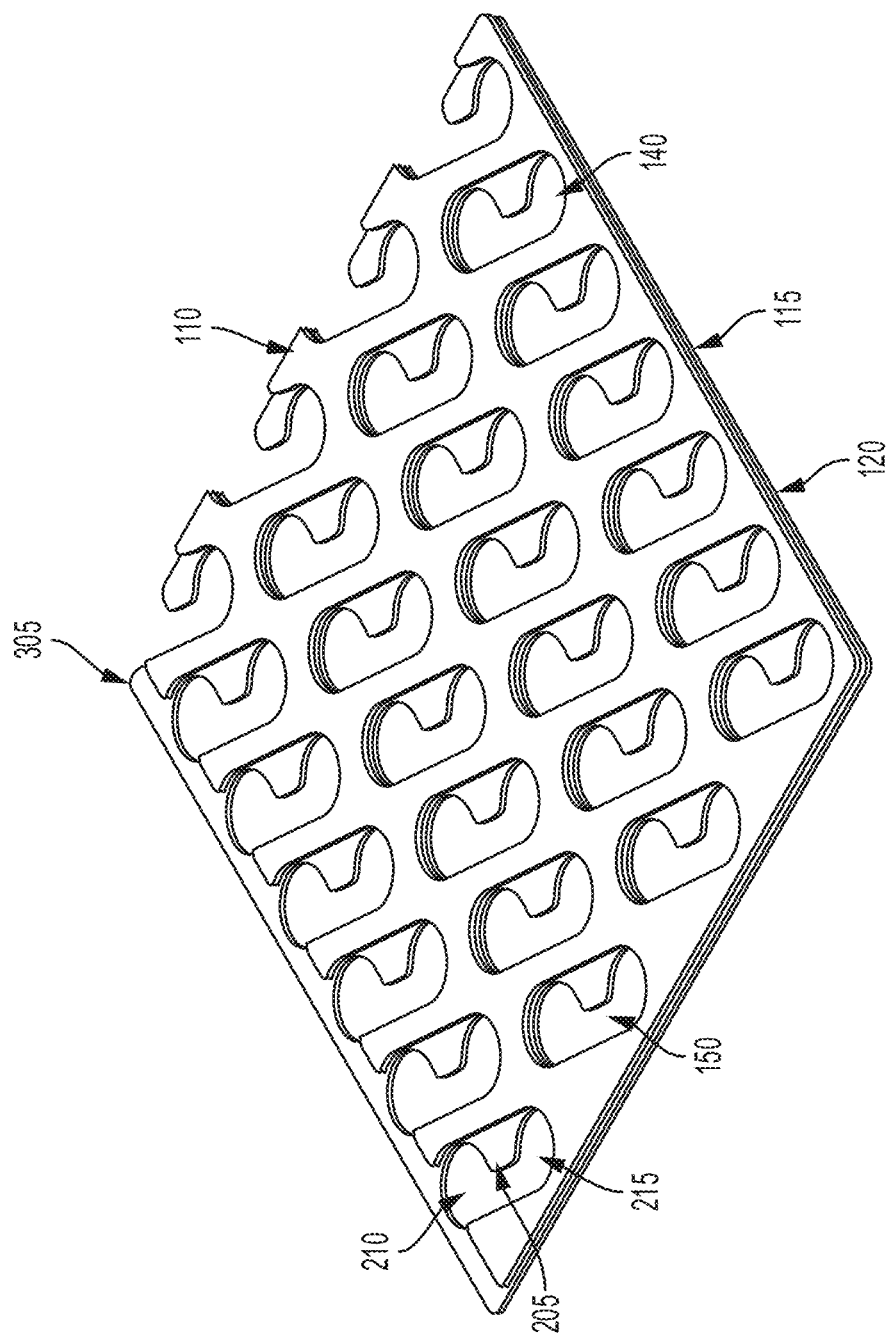
FIG. 3 depicts an isometric view of an illustrative embodiment of a system to power an electric vehicle.
Figure 4:
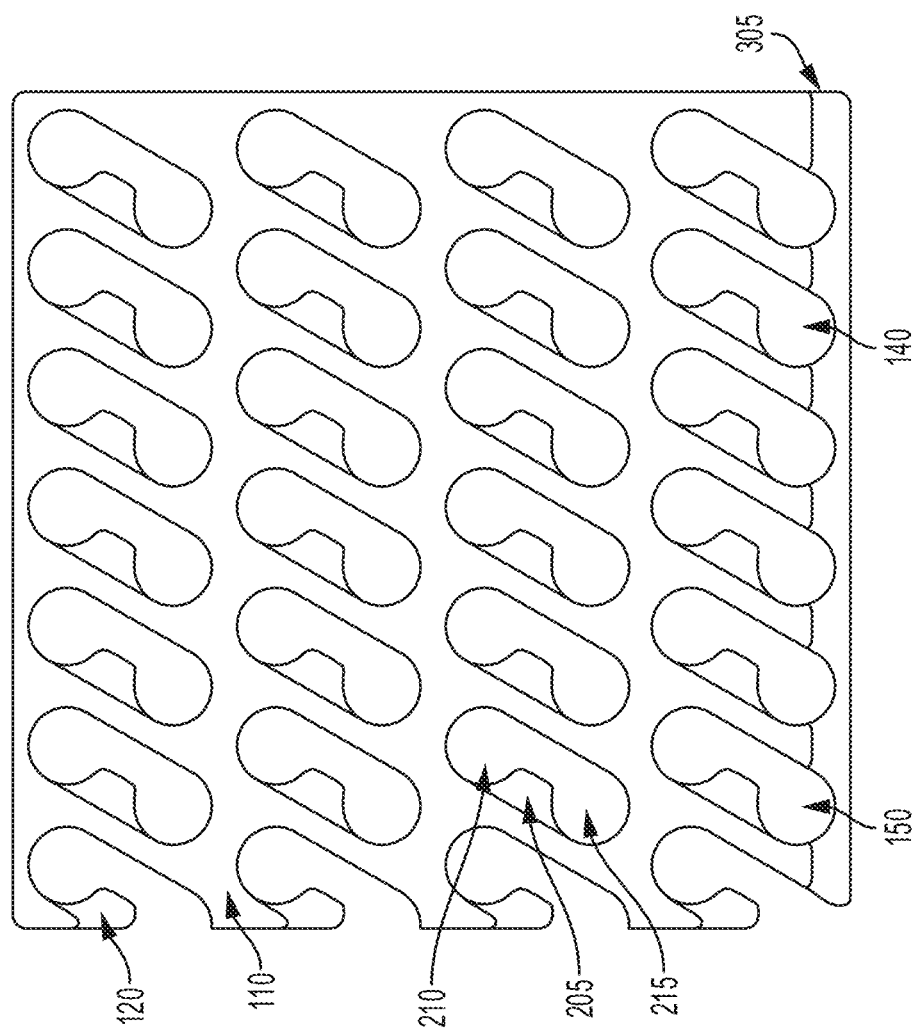
FIG. 4 depicts a top view of an illustrative embodiment of a system to power an electric vehicle.

FIGS. 3-4, among others, depict the dimensions, shapes, or geometry of the apertures 140, 145, 150 of the first current collector 110, the isolation layer 115, and the second current collector 120. The apertures 140, 145, 150 can be formed based the shape, dimensions, or geometry of each other and to provide appropriate spacing to allow for the battery cells 105 to couple with the first current collector 110 and the second current collector 120. For example, the shape, dimensions, or geometry of the apertures 140, 145, 150 can be selected such that when the first current collector 110, the isolation layer 115, and the second current collector 120 are coupled with each other or stacked onto each other, the apertures 140, 145, 150 are aligned to allow at least two battery cells 105 to couple with at least one negative tab 205 of the second current collector 120 and at least one battery cell 105 to couple with the first current collector 110 through a positive tab of the at least one battery cell 105. As depicted in FIG. 3, the first current collector 110 is coupled with or disposed over the isolation layer 115 and the isolation layer 115 is coupled with or disposed over the second current collector 120. In this example arrangement, the third plurality of apertures 150 are aligned with the first and second plurality of apertures 140, 145 such that the negative tabs 205 extend out in a generally middle portion of each of the apertures 140, 145, 150 between the first region 210 and the second region 215. Thus, when a first battery cell 105 is coupled with or disposed in the first region 210 and a second battery cell 105 is coupled with or disposed in the second region 215, a portion or surface of each of the first battery cell 105 and the second battery cell 105 can couple with or contact the negative tab 205 and have proper clearance or spacing to allow for a first positive tab of the first battery cell 105 to couple the first battery cell 105 with the first current collector 110 and a second positive tab of the second battery cell 105 to couple the second battery cell 105 with the first current collector 110.

The first plurality of apertures 140 can have a different shape, dimensions, or geometry from the second plurality of apertures 145 or the third plurality of apertures 150. The shape, dimensions, or geometry of the first plurality of apertures 140 can be the same or similar to the second plurality of apertures 145 and different than the shape, dimensions, or geometry of the third plurality of apertures 150. The isolation layer 115 can include a creepage portion 305 that extends from one or more edges or side surfaces of the isolation layer 115. The creepage portion 305 can have a predetermined length to extend beyond one or more edges or side surfaces of the isolation layer 115 to space, separate or distance the first collector 110 from the second collector 120 by a predetermined creepage clearance or spacing. The creepage portion 305 can have a predetermined thickness to space the first collector 110 from the second collector 120 at a predetermined creepage clearance or spacing. For example, a thickness or width of the creepage portion 305 can be selected such that the first current collector 110 is spaced at least 3 mm from the second current collector 120 when the isolation layer 115 is disposed between the first current collector 110 and the second current collector 120. The predetermined creepage clearance can include a range from 1 mm to 5 mm (e.g., 3 mm). Thus, the dimensions of the creepage portion 305 can be selected, based in part, to meet creepage clearance specifications or requirements. The dimensions of the creepage portion 305 can reduce or eliminate arcing along an insulating surface between the first current collector 110 and the second current collector 120.

The creepage portion 305 can be formed in the same plane as the isolation layer 115. For example, the creepage portion 305 can be formed having a straight shape such that it extends out parallel with respect to a surface or plane of the isolation layer. The creepage portion 305 can be formed or coupled with one edge or side surface of the isolation layer 115 or the creepage portion 305 can be formed or coupled with multiple edges or multiple side surfaces of the isolation layer 115 (e.g., two sides, three sides, all sides). The isolation layer 115 can include or be formed as an injection molded plastic piece that forms around either the first current collector 110 or second current collector 120 to provide the predetermine creepage clearance. For example, the plastic piece can be formed to provide creepage protection not only for the parallel extension from the respective conductive layer (e.g., first current collector 110, second current collector 120), but can also increase a height (or thickness) of the respective conductive layer (e.g., first current collector 110, second current collector 120). A coating (e.g., powder coating, anodizing, conformal coating, or other spray coating) can be applied to one or more edge surfaces of the isolation layer 115, first current collector 110, or second current collector 120 to coat the respective edges and unbonded (where no electrical connection is made) areas. The coating can be used in conjunction with the parallel extension of isolation layer 115 or can be used instead of the parallel extension of isolation layer 115.

Figure 11:
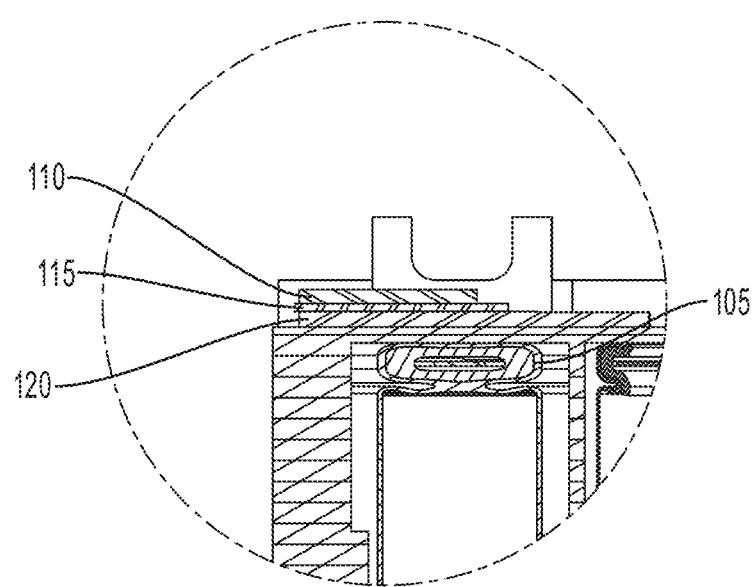
FIG. 11 depicts a view of a spatial relationship between a positive current collector, an isolation layer, and a negative current collector relative to a battery cell.

FIG. 11 depicts a view of the spatial relationship between the positive current collector 110, the isolation layer 115, and the negative current collector 120 relative to a battery cell 105. As depicted in FIG. 11, the isolation layer 115 extends beyond one or more edges or side surfaces of the first current collector 110 and the second current collector 120 to space, separate or distance the first collector 110 from the second collector 120 by a predetermined creepage clearance or spacing. The portion of the isolation layer 115 that extends out beyond one or more edges or side surfaces of the first current collector 110 and the second current collector 120 may be the same as the creepage portion 305 described above with respect to FIG. 3. For example, the isolation layer 115 can include a creepage portion having a predetermined length to space, separate or distance the first collector 110 from the second collector 120 by a predetermined creepage clearance or spacing. The creepage portion 305 of the isolation layer 115 can have a predetermined thickness to space the first collector 110 from the second collector 120 at a predetermined creepage clearance or spacing. The predetermined creepage clearance can include a range from 1 mm to 5 mm (e.g., 3 mm). Thus, the dimensions of the creepage portion of the isolation layer 115 can be selected, based in part, to meet creepage clearance specifications or requirements. The dimensions of the creepage portion of the isolation layer 115 can reduce or eliminate arcing along an insulating surface between the first current collector 110 and the second current collector 120. For example, the isolation layer 115 can extend out farther than an end or edge portion of the first current collector 110 and the second current collector 120 relative to a horizontal plane or a vertical plane to space the first current collector 110 and the second current collector 120 from each other a distance corresponding to creepage clearance specifications or requirements.

Referring to FIG. 3, among others, the positive current collector 110 and the negative current collector 120 can be electrically conductive and can be laminated together with the isolation layer 115 (e.g., nonconductive layer) disposed between the positive current collector 110 and the negative current collector 120. For example, FIG. 3 shows an embodiment of the stacked configuration of current collectors, in isometric view. In this view, the positive current collector 110 and the negative current collector 120 are shown laminated together, as opposed to the exploded view in FIG. 2.

FIG. 4, among others, depicts a top view of the stacked configuration of current collectors, including portions of the positive current collector 110, exposed portions of the negative current collector 120, and the apertures 140, 150 of the first current collector 110 and the second current collector 120, respectively, is provided. The isolation layer 115 can enable or support the lamination, and can include an isolation material or insulation material having high dielectric strength that can provide electrical isolation between the first current collector 110 and the second current collector 120. The isolation layer 115, including a lamination layer or lamination material, can hold the first current collector 110 and the second current collector 120 together. The lamination layer can provide a conformal coating that is disposed over one or more of the first current collector 110, the isolation layer 115, or the second current collector 120, and can protect against shorting from the first current collector 110 (e.g., positive current collector) and the second current collector 120 (e.g., negative current collectors). The lamination layer can be disposed such that weld areas (e.g., for welding to battery cell terminals) are not covered, or remain exposed to allow electrical connections. This design can support different weld or bonding techniques, such as wire bonding or laser welding (e.g., for the negative connections).

Using the single sided weld approach discussed herein, the positive terminal connections to the first current collector 110 and the negative terminal connections to the second current collector 120 can be made from the same end of the battery cell 105 at which the top cap is located. The rim 135, edge or other portion of the top cap assembly can form or provide a negative terminal and can be welded to a current collector for negative collections. Welding can be performed to for example a narrow and non-flat (protruded) profile of the rim at the top cap (e.g., along the round edge that extends into the cylindrical surface of the battery cell), to connect the negative terminal to a portion of a current collector for negative collections. For example, welding can be performed to connect the negative terminal to an aperture edge (e.g., of a tabbed or protruded portion of the aperture), or an upper surface portion (e.g., of a tabbed or protruded portion of the aperture) of the current collector (e.g., negative current collector 120) for negative collections. The positive terminal tab portion of the top cap can connect to a portion of a current collector (e.g., first current collector 110) for positive collections. For example, welding can be performed to an aperture edge or top surface portion of the current collector for positive collections. Hence, in accordance with the concepts disclosed herein, a current collector configuration is provided that can support positive and negative weld connections at the top cap end, that can support one or more methods for welding, that can support tool access (e.g., for welding, assembly), and that can provide isolation between the negative and positive current collectors.

Referring for example to FIGS. 1-4, the bottom layer of the first cell holder 125 can incorporate, be physically coupled with, or expose a negative current collector or second current collector 120, partially or otherwise. The second current collector 120 can be made of a thin conductive metal (e.g., of less than 5 mm in thickness, although other dimensions are possible). The second current collector 120 can be made of or include a metal, such as but not limited to, copper or aluminum, and can be affixed or mounted (e.g., directly) on a battery cell 105. The second current collector 120 can be designed or implemented with precise cut-outs or apertures 150 where a wirebond head can touch the rim 135 of the battery cell 105 and bond to the second current collector 120. The second current collector 120 can be designed or implemented with partial cut-outs or partially-formed apertures 150 at or along one or more edges of the layer, to expose at least one positive terminal of the battery cells 105 through the layer. The second current collector 120 can be designed or implemented to support resistive welding for instance, in which a bondhead can contact the second current collector 120 directly and weld to the rim 135 to make a negative terminal connection.

The isolation layer 115 can be disposed or stacked above the second current collector 120 to provide isolation from the first current collector 110 (e.g., positive current collector). The first current collector 110 can comprise a thin conductive metal (e.g., of less than 5 millimeter in thickness, although other dimensions are contemplated) or metal layer. The first current collector 110 can be made of a metal such as copper or aluminum, and can be affixed or mounted (e.g., directly) on a battery cell 105. The first current collector 110 can be designed or implemented with precise cut-outs or apertures 140 whereby a positive terminal connection can be made by welding from the positive tab portion to the first current collector 110 (e.g., a top surface portion of the first current collector 110, or an edge surface portion of a corresponding aperture 140). The first current collector 110 can be designed or implemented with partial cut-outs or partially-formed apertures 140 at or along one or more edges of the layer, to expose at least one positive terminal of the battery cells 105 through the layer. The stacked configuration can incorporate protective features including channels, routing vents, cutouts or apertures 140, 145, 150 in the first current collector 110, the second current collector 120, or the isolation layer 115, for vent gasses to escape through the top (e.g., to support certain types of battery cells 105, such as bottom vent cells).

The apertures 140, 150 (or cutouts) in the first current collector 110 or the second current collector 120 can be created to enable specific connections to a battery cell rim or tab region. For instance, the apertures 150 of the second current collector 120 can each have an area smaller than that of a corresponding aperture 140 of the positive current collector 110. For example, as shown in FIG. 4, each aperture 150 of the second current collector 120 can have a smaller area (than that of a corresponding aperture of the first current collector 110) due to an edge, tabbed portion, or negative tab 205 protruding towards a center of the respective aperture 150 (and partially conforming to a circular or curved boundary of each of the regions 210, 215). A portion of the second current collector 120 proximate to or on a portion of the negative tab 205 (e.g., the curved portion of the edge) can be designed or configured to be welded or bonded to a corresponding negative terminal (or rim region 135) of a battery cell 105. A region proximate to or on a curved portion or edge of a corresponding aperture 140 of the first current collector 110 (that is away from, or that does not coincide with the above portion of the second current collector 120, for instance), can be welded or bonded to a corresponding positive terminal (or tab region). To provide electrical isolation, certain portions of the apertures 140, 150 of the first current collector 110 or second current collector 120 can have aperture edges that are electrically isolated (e.g., via a nonconductive coating) from the positive terminals of the plurality of battery cells 105, or from the wirebond or weld.

The first current collector 110 and the second current collector 120 (e.g., the positive and negative current collectors) can be incorporated into a single part or component. For example, the first current collector 110 and the second current collector 120 can include a layered device and a laminated device incorporated or otherwise formed into a single part or component. Such a design can enable a single sided, top weld approach for cylindrical battery cells 105 to make electrical connections from one battery cell 105 to another from the top cap side. Single sided welding for positive and negative connections can be comparatively easier to handle or perform than the dual sided approach, by simplifying assembly processes for battery blocks or modules (e.g., battery blocks 100 and battery modules 500 of FIG. 5). A single part, stacked current collector structure can improve battery cell 105 to battery cell 105 interconnection design, for instance by decreasing the number of parts for connecting to battery cells 105, and isolating first current collector 110 and second current collector 120 while holding these together. Laminating current collectors in such a configuration can protect against shorting by limiting exposed areas to those for welding for instance. The stacked current collector configuration can incorporate additional cutouts to allow vent gas to escape from the top.

Aspects of stacked conductive layers are discussed herein by way of example. Instead of stacked layers (e.g., in the z direction), a first or positive current collector 110 can comprise strips of conductors arranged in a parallel configuration along a first direction (e.g., in the x direction), and a second or negative current collector 120 can comprise strips of conductors arranged in a parallel configuration along a second direction (e.g., in the y direction) different from the first direction. In addition, the design of the current collectors can be adjusted to support different welding strategies, such as those other than wirebond, laser or resistive welding.

FIG. 5, among others, depicts an example system to power electric vehicles. In FIG. 5, a battery module 500 is provided having two battery blocks 100 (e.g., a first battery block 100 and a second battery block 100). The first and second battery blocks 100 can be subcomponents of the battery module 500. A battery module 500 as described herein can refer to a battery system having multiple battery blocks 100 (e.g., two or more). Multiple battery blocks 100 can be electrically coupled with each other to form a battery module 500. For example, a high-torque motor may be suitably powered by a battery module 500 formed with multiple battery blocks 100, each battery block 100 having multiple battery cells 105 (e.g., 500 cells). The battery blocks 100 or battery modules 500 can couple in parallel to increase capacity and to increase current values (e.g., in Amperes or amps) that can be discharged. A battery block 100 can be formed with 20 to 50 battery cells 105, for instance, and can provide a corresponding number of times the capacity of a single battery cell 105.

The battery modules 500 can be formed having a variety of different shapes. For example, the shape of the battery modules 500 can be determined or selected to accommodate a battery pack within which a respective battery module 500 is to be disposed. The shape of the battery modules 500 may include, but not limited to, a square shape, rectangular shape, circular shape, or a triangular shape. Battery modules 500 in a common battery pack can have the same shape. One or more battery modules 500 in a common battery pack can have a different shape from one or more other battery modules 500 in the common battery pack. Battery blocks 100 can be held together using one or more cell holders 125, 130. For example, a single one of cell holders 125, 130 can house at least two battery blocks 100 in a single plastic housing. The battery cells 105 can be positioned within the respective one of the cell holder 125, 130 using adhesive material (e.g., 2-part epoxy, silicone-based glue, or other liquid adhesive), heat staking, or press fit. The battery cells 105 can be positioned within the respective one of the cell holder 125, 130 to hold them in place. For example, the battery cells 105 can have a tolerance in height as part of the manufacturing process. This tolerance can be accounted for by locating either the top or bottom of the respective battery cells 105 to a common plane and fixing them there within the respective one of the cell holder 125, 130. For example, a bottom end of each of the battery cells 105 can be positioned flat relative to each other to provide a flat mating surface to a cold plate. The top end of the battery cells 105 can be positioned flat relative to the first cell holder 125 to provide or form a flat plane for forming battery cell to current collector connections (e.g., wirebonding, laser welding). The flat plane may only be provided on a top or bottom plane of the battery cells 105 because the cell holders 125, 130 can be retained in the respective battery module 500 using adhesive material (e.g., 2-part epoxy, silicone-based glue, or other liquid adhesive), bolts/fasteners, pressure sensitive adhesive (PSA) tape, or a combination of these materials. The structure of the battery module 500 that the cell holders 125, 130 are placed in or disposed in can include a stamped, bent, or formed metal housing or could be a plastic housing made by injection molding or another manufacturing method.

The number of battery blocks 100 in a battery module 500 can vary and can be selected based at least in part on an amount of energy or power to be provided to an electric vehicle. For example, the battery module 500 can couple with one or more bus-bars within a battery pack or couple with a battery pack of an electric vehicle to provide electrical power to other electrical components of the electric vehicle. The battery module 500 includes multiple battery blocks 100. The battery module 500 can include multiple cell holders 125, 130 to hold or couple the battery blocks 100 together, and to couple the battery cells 105 to form the battery blocks 100 together. The first and second battery blocks 100 include a plurality of battery cells 105. The battery cells 105 can be homogeneous or heterogeneous in one or more aspects, such as height, shape, voltage, energy capacity, location of terminal(s) and so on. The first battery block 100 may include the same number of battery cells 105 as the second battery block 100, or the first battery block 100 may have a different number of battery cells 105 (e.g., greater than, less than) the second battery block 100. The first and second battery blocks 100 can include any number of battery cells 105 arranged in any configuration (e.g., an array of N×N or N×M battery cells, where N, M are integers). For example, a battery block 100 may include two battery cell 105 or fifty battery cells 105. The number of battery cells 105 included within a battery block 100 can vary within or outside this range. The number of battery cells 105 included within a battery block 100 can vary based in part on battery cell level specifications, battery module level requirements, battery pack level requirements or a combination of these that you are trying to obtain or reach with the respective battery block 100. The number of battery cells 105 to include in a particular battery block 100 can be determined based at least in part on a desired capacity of the battery block 100 or a particular application of the battery block 100. For example, a battery block 100 can contain a fixed "p" amount of battery cells, connected electrically in parallel which can provide a battery block capacity of "p" times that of the single battery cell capacity. The voltage of the respective battery block 100 (or cell block) can be the same as that of the single battery cell 105 (e.g., 0V to 5V or other ranges), which could be treated as larger cells that can be connected in series into the battery module 500 for battery packs for example. For example, the plurality of cylindrical battery cells 105 can provide a battery block capacity to store energy that is at least five times greater than a battery cell capacity of each of the plurality of cylindrical battery cells 105. The battery blocks 100 can have a voltage of up to 5 volts across the pair of battery block terminals of the respective battery block 100.

The battery blocks 100 can each include one or more battery cells 105 and each of the plurality of battery cells 105 can have a voltage of up to 5 volts (or other limit) across terminals of the corresponding battery cell 105. For example, the battery blocks 100 can include an arrangement of a plurality of battery cells 105 electrically connected in parallel. Each cell of the plurality of battery cells 105 can be spatially separated from each of at least one adjacent cell 105 by, for example, two millimeter (mm) or less. The arrangement of the plurality of battery cells 105 can form a battery block 100 for storing energy and can have a voltage of up to 5 volts across terminals of the respective battery block 100.

For instance, a single battery cell 105 can have a maximum voltage of 4.2V, and the corresponding battery block 100 can have a maximum voltage of 4.2V. By way of an example, a battery block 100 using 5 volts/5 Ampere-hour (5V/5 Ah) cells with 60 cells in parallel can become a 0V to 5V, 300 Ah modular unit. The battery block 100 can have high packaging efficiency by utilizing the minimum cell to cell spacing (e.g., any value from 0.3 mm to 2 mm) that prevents thermal propagation within the block with each cell having an individual and isolated vent port for instance. For example, spatial separation between adjacent cells of less than 1 mm can be implemented in the present battery blocks 100. The battery block 100 can thus be small, e.g., less than 0.05 cubic feet, giving it a high volumetric energy density for high packing efficiency.

The battery block 100 can include battery cells 105 physically arranged in parallel to each other along the longest dimension of each battery cell 105. The battery cells 105 can be arranged physically as a two dimensional array of battery cells 105, or can be arranged physically as a three dimensional array of battery cells 105. For example, the battery cells 105 can be arranged in an array formation having three values, such as a length value 550, a height value (or depth value) 555, and a width value 560 to form the battery block 100 and form battery module 500. As depicted in FIG. 5, the battery module 500 can have a dimension of length 550×width 560×height 555. The battery module 500 can have a length value 550 of 200 mm, a width value 560 of 650 mm, and a height value 555 of 100 mm. The length 550 may range from 25 mm to 700 mm. The width 560 may range from 25 mm to 700 mm. The height 555 (or depth) may range from 65 mm to 150 mm. The height 555 of the battery module 500 or the battery blocks 100 may correspond to (or be dictated by) the height or longest dimension of a component the battery cell 105.

The battery blocks 100 may form or include an enclosure or housing. For example, the plurality of battery cells 105 can be enclosed in a battery block enclosure. The battery block enclosure can be formed in a variety of different shapes, such as but not limited to, a rectangular shape, a square shape or a circular shape. The battery block enclosure can be formed having a tray like shape and can include a raised edge or border region. The battery cells 105 can be held in position by the raised edge or border region of the battery block enclosure. The battery block enclosure can be coupled with, in contact with, or disposed about the plurality of battery cells 105 to enclose the plurality of battery cells 105. For example, the battery block enclosure can be formed such that it at least partially surrounds or encloses each of the battery cells 105. The battery block enclosure can be less than 1 cubic feet in volume. For example, the battery block enclosure can be less than 0.05 cubic feet in volume.

The battery cells 105 can be provided or disposed in the first and second battery blocks 100 and can be arranged in one or more rows and one or more columns of battery cells 105. Each of the rows or columns of battery cells 105 can include the same number of battery cells 105 or they can include a different number of battery cells 105. The battery cells 105 can be arranged spatially relative to one another to reduce overall volume of the battery block 100, to allow for minimum cell to cell spacing (e.g., without failure or degradation in performance), or to allow for an adequate number of vent ports. The rows of battery cells 105 can be arranged in a slanted, staggered or offset formation relative to one another. The battery cells 105 can be placed in various other formations or arrangements.

Each of the battery cells 105 in a common battery block 100 (e.g., same battery block 100) can be spaced from a neighboring or adjacent battery cell 105 in all directions by a distance that ranges from 0.5 mm to 3 mm (e.g., 1.5 mm spacing between each battery cell 105, 2 mm spacing between each battery cell 105). The battery cells 105 in a common battery block 100 can be uniformly or evenly spaced. For example, each of the battery cells 105 can be spaced the same distance from one or more other battery cells 105 in the battery blocks 100. One or more battery cells 105 in a common battery block 100 can be spaced one or more different distances from another one or more battery cells 105 of the common battery block 100. Adjacent battery cells 105 between different battery blocks 100 can be spaced a distance in a range from 2 mm to 6 mm. The distances between the battery cells 105 of different battery blocks 100 can vary across applications and configurations, and can be selected based at least in part on the dimensions of the battery blocks 100, electrical clearance or creepage specifications, or manufacturing tolerances for the respective battery module 500.

The battery block 100 can provide a battery block capacity of up to 300 Ampere-hour (Ah) or more. The battery block 100 can provide varying capacity values. For example, the battery block 100 can provide a capacity value that corresponds to a total number of cylindrical battery cells 105 in the plurality of cylindrical battery cells 105 forming the respective battery block 100. For example, the battery block 100 can provide a battery block capacity in a range from 8 Ah to 600 Ah.

The battery blocks 100 can be formed having a variety of different shapes. For example, the shape of the battery blocks 100 can be determined or selected to accommodate a battery module 500 or battery pack within which a respective battery block 100 is to be disposed. The shape of the battery blocks 100 may include, but not limited to, a square shape, rectangular shape, circular shape, or a triangular shape. Battery blocks 100 in a common battery module 500 can have the same shape, or one or more battery blocks 100 in a common battery module 500 can have a different shape from one or more other battery blocks 100 in the common battery module 500.

The battery blocks 100 can each include at least one cell holder 125, 130 (sometimes referred as a cell holder). For example, the first and second battery blocks 100 can each include a first cell holder 125 and a second cell holder 130. The first cell holder 125 and the second cell holder 130 can house, support, hold, positon, or arrange the battery cells 105 to form the first or second battery blocks 100 and may be referred to herein as structural layers. For example, the first cell holder 125 and the second cell holder 130 can hold the battery cells 105 in predetermined positions or in a predetermined arrangement to provide the above described spatial separation (e.g., spacing) between each of the battery cells 105. The first cell holder 125 can couple with or be disposed on or over a top surface of each of the battery cells 105. The second cell holder 130 can couple with or contact a bottom surface of the each of the battery cells 105.

The first cell holder 125 and the second cell holder 130 can include one or more recesses, cutouts or other forms of holes or apertures configured to hold portions of the battery cells 105. The recesses, cutouts or other forms of holes or apertures of the first and second cell holders 125, 130 can be formed to conform or match with, or correspond to the dimensions of the battery cells 105. For example, each of the recesses, cutouts or other forms of holes or apertures can have the same dimensions (e.g., same diameter, same width, same length) as each of the battery cells 105 to be disposed within the respective recess, cutout, or other forms of holes or apertures. The battery cells 105 can be disposed within the recesses, cutouts or other forms of holes or apertures such that they are flush with an inner surface of the recesses, cutouts or other forms of holes or apertures. For example, an outer surface of each of the battery cells 105 can be in contact with the inner surface of the recesses, cutouts or other forms of holes or apertures of each of the first and second cell holders 125, 130 when the battery cells 105 are disposed within or coupled with the recesses, cutouts or other forms of holes or apertures of each of the first and second cell holders 125, 130.

The battery module 500 can include a single battery block 100 or multiple battery blocks 100 (e.g., two battery blocks 100, or more than two battery blocks 100). The number of battery blocks 100 in a battery module 500 can be selected based at least in part on a desired capacity, configuration or rating (e.g., voltage, current) of the battery module 500 or a particular application of the battery module 500. For example, a battery module 500 can have a battery module capacity that is greater than the battery block capacity forming the respective battery module 500. The battery module 500 can have a battery module voltage greater than the voltage across the battery block terminals of the battery block 100 within the respective battery module 500. The battery blocks 100 can be positioned adjacent to each other, next to each other, stacked, or in contact with each other to form the battery module 500. For example, the battery blocks 100 can be positioned such that a side surface of the first battery block 100 is in contact with a side surface of the second battery block 100. The battery module 500 may include more than two battery blocks 100. For example, the first battery blocks 100 can have multiple side surfaces positioned adjacent to or in contact with multiple side surfaces of other battery blocks 100. Various types of connectors can couple the battery blocks 100 together within the battery module 500. The connectors may include, but not limited to, straps, wires, ribbonbonds, adhesive layers, or fasteners. The electrical connections between battery blocks 100 and battery modules 500 can use aluminum or copper busbars (stamped/cut metallic pieces in various shapes) with fasteners, wires and ribbons (aluminum, copper, or combination of the two), press fit studs and connectors with copper cables, or bent/formed/stamped copper or aluminum plates.

Figure 6:
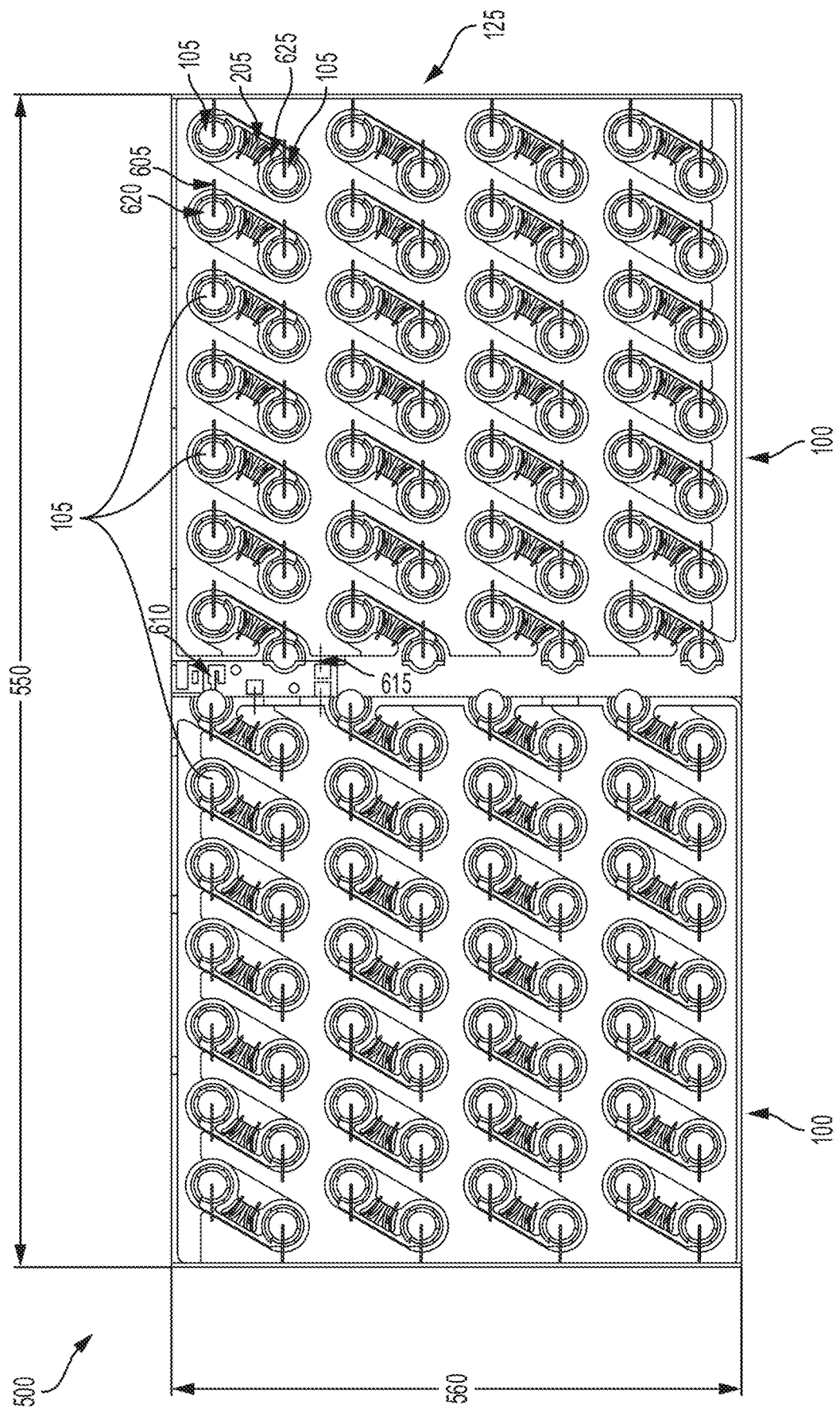
FIG. 6 depicts a top view of an illustrative embodiment of a system to power an electric vehicle.

FIG. 6, among others, depicts a top view of the battery module 500 illustrating an example arrangement of the battery cells 105 in each of the first battery block 100 and the second battery block 100. The battery blocks 100 can include a pair of terminals 620, 625. For example, the battery blocks 100 include a first battery block terminal 620 and a second battery block terminal 635. The first battery block terminal 620 can correspond to a positive terminal and the second battery block terminal 625 can correspond to a negative terminal The plurality of cylindrical battery cells 105 can provide a battery block capacity to store energy that is at least five times greater than a battery cell capacity of each of the plurality of cylindrical battery cells 105. The battery blocks 100 can have a voltage of up to 5 volts across the pair of battery block terminals 620, 625. For example, the first battery block terminal 620 can be coupled with 5 V and the second battery block terminal 625 can be coupled with 0 v. The first battery block terminal 620 can be coupled with +2.5 V and the second battery block terminal 625 can be coupled with −2.5 V. Thus, a difference in voltage between the first battery block terminal 620 and the second battery block terminal 625 can be 5 V or up to 5 V.

The battery cells 105 in the first and second battery blocks 100 can be arranged in one or more rows and one or more columns of battery cells 105. The individual battery cells 105 can be cylindrical cells or other types of cells. Depending on the shape of each battery cell 105, the battery cells 105 can be arranged spatially relative to one another to reduce overall volume of the battery block 100, to minimize cell to cell spacing (e.g., without failure or degradation in performance), or to allow for an adequate number of vent ports. For instance, FIG. 6, among others, shows each row of battery cells 105 arranged in a slanted or offset formation relative to one another. The battery cells 105 can be placed in various other formations or arrangements.

The battery cells 105 in a common battery block 100 can be uniformly spaced, evenly spaced or one or more battery cells 105 in a common battery block 100 can be spaced one or more different distances from another one or more battery cells 105 of the common battery block 100. Each of the battery cells 105 in a common battery block 100 (e.g., same battery block 100) can be spaced from a neighboring or adjacent battery cell 105 in all directions by a distance that ranges from 0.5 mm to 3 mm (e.g., 1.5 mm spacing between each battery cell 105, 2 mm spacing between each battery cell 105). For example, a first battery cell 105 can be spaced a distance of 1.5 mm from a neighboring second battery cell 105 and spaced a distance of 1.5 mm from a neighboring third battery cell 105. The battery cells 105 in a common battery block 100 can be uniformly spaced, or evenly spaced. One or more battery cells 105 in a common battery block 100 can be spaced one or more different distances from another one or more battery cells 105 of the common battery block 100. Depending on the shape of each battery cell 105, the battery cells 105 can be arranged spatially relative to one another to reduce overall volume of the battery block 100, to allow for minimum cell to cell spacing (e.g., without failure or degradation in performance), or to allow for an adequate number of vent ports. For instance, each row of battery cells 105 can be arranged in a slanted or offset formation relative to one another. The battery cells 105 can be placed in various other formations or arrangements.

The battery cells 105 (e.g., adjacent battery cells 105) between different battery blocks 100 (e.g., adjacent battery blocks 100) can be spaced a distance in a range from 2 mm to 6 mm. For example, one or more battery cells 105 disposed along an edge of a first battery block 100 can be spaced a distance in a range from 0 mm to 1 mm (e.g., 0.5 mm) from the edge of the first battery block 100 and one or more battery cells 105 disposed along an edge of a second battery block 100 can be spaced a distance in a range from 0 mm to 1 mm (e.g., 0.5 mm) from the edge of the second battery block 100. The edges of the first and second battery blocks 100 can be coupled with each other, in contact with each other, or facing each other such that the one or more battery cells 105 disposed along the edge of the first battery block 100 are spaced from the one or more battery cells 105 disposed along the edge of the second battery block 100 a distance in a range from 2 mm to 6 mm (e.g., 4.5 mm). The distances between the battery cells 105 of different battery blocks 100 can vary and can be selected based at least in part on the dimensions of the battery blocks 100, electrical clearance or creepage specifications, or manufacturing tolerances for the respective battery module 500. For example, battery cells 105 can be spaced a distance from a second, different battery cell 105 based on predetermined manufacturing tolerances that may control or restrict how close battery cells 105 can be positioned with respect to each other.

The battery cells 105 can each couple with a first layer 110 (e.g., positive conductive layer) of the first cell holder 125. For example, the first cell holder 125 can include multiple layers, such as, a first layer forming a positive current collector 110, an isolation layer having non-conductive material 115, and a second layer forming negative current collector 120. Each of the battery cells 105 can include a pair of battery cell terminals 620, 625. For example, the battery cells 105 can include a positive terminal 620 and a negative terminal 625. The pair of terminals 620, 625 of each of the battery cells 105 can have up to 5 V across their respective terminals. For example, the positive terminal 620 can be coupled with +5 V and the negative terminal 625 can be coupled with 0 V. The positive terminal 620 can be coupled with +2.5 V and the negative terminal 625 can be coupled with −2.5 V. Thus, the difference in voltage between the positive terminal 620 and the negative terminal 625 of each battery cell 105 can be 5 V or in any value up to and including 5 V.

The positive terminal 620 of a battery cell 105 can be connected using a wirebond 605 or otherwise, with the first layer of the first cell holder 125. The negative terminal 625 or negative surface of a battery cell 105 can connect with the second layer of the first cell holder 125 through a negative tab 205. The positive terminal 620 and the negative terminal 625 of a battery cell 105 can be formed on or coupled with at least a portion of the same surface (or end) of the respective battery cell 105. For example, the positive terminal 620 can be formed on or coupled with a first surface (e.g., top surface, side surface, bottom surface) of the battery cell 105 and the negative terminal 625 of the battery cell 105 can be formed on or coupled with the same first surface. Thus, the connections to positive and negative bus-bars or current collectors can be made from the same surface (or end) of the battery cell 105 to simplify the installation and connection of the battery cell 105 within a battery block 100.

The negative tab 205 can couple at least two battery cells 105 with a conductive negative layer 120 of the first cell holder 125. The negative tab 205 can be part of the conductive negative layer 120, for example formed as an extension or structural feature within a plane of the conductive negative layer 120, or partially extending beyond the plane. The negative tab 205 can include conductive material, such as but not limited to, metal (e.g., copper, aluminum), or a metallic alloy or material. The negative tab 205 can form or provide a contact point to couple a battery cell 105 to a negative current collector 120 of the first cell holder 125. The negative tab 205 can couple with or contact a top portion or top surface (e.g., negative terminal 625) of the battery cell 105. The negative tab 205 can couple with or contact a side surface of a battery cell 105. The negative tab 205 can couple with or contact a bottom portion or bottom surface of a battery cell 105. The surface or portion of a battery cell 105 the negative tab 205 couples with or contacts can correspond to the placement of the first cell holder 125 relative to the battery cell 105.

The negative tab 205 can have a shape configured to couple with or contact surfaces of at least two battery cells 105. The negative tab 205 can be formed in a variety of different shapes and have a variety of different dimensions (e.g., conformed to the dimensions of the battery cells 105 and their relative positions). The shape of the negative tab 205 can include, but not limited to, rectangular, square, triangular, octagon, circular shape or form, or one or more combinations of rectangular, square, triangular, or circular shape or form. For example, the negative tab 205 can be formed having one or more sides (e.g., portions or edges) having a circular or curved shape or form to contact a surface of the battery cells and one or more sides having a straight or angled shape. The particular shape, form or dimensions of the negative tab 205 can be selected based at least in part on a shape, form or dimensions of the battery cells 105 or a shape, form or dimensions of the first cell holder 125. The shape and structure of the negative tab 205 can be formed in two or three dimensions. For example, one or more edges or portions of the negative tab 205 can be folded or formed into a shape or structure suitable for bonding to a negative terminal portion of a battery cell 105. For a two-dimensional negative tab 205 (e.g., a negative tab 205 with a thickness conformed with a thickness of the corresponding conductive negative layer), the negative tab 205 can include or be described with one or more parameters, such as length, a width, surface area, and radius of curvature. For a three-dimensional negative tab 205 (e.g., a negative tab 205 with at least a portion that does not conform with a thickness of the corresponding conductive negative layer), the negative tab 205 can include or be described with one or more parameters, including length, width, height (or depth, thickness), one or more surface areas, volume, and radius of curvature. The three-dimensional negative tab 205 can include a folded, curved or accentuated portion that provides a larger surface for a negative surface of a battery cell 105 to couple with or contact. For example, the three-dimensional negative tab 205 can have a greater thickness than a two-dimensional negative tab 205.

The wirebond 605 can be a positive wirebond 605 that can couple at least one battery cell 105 with a conductive positive layer 110 of the cell holder 125. The wirebond 605 can be formed in a variety of different shapes and have a variety of different dimensions. The particular shape or dimensions of wirebond 605 can be selected based at least in part on a shape or a dimension of the battery cells 105 or a shape or a dimension of the first cell holder 125. For example, the wirebond 605 can be sized to extend from a top surface, side surface or bottom surface of a battery cell 105. As depicted in FIG. 6, the wirebond 605 can extend from a top surface (e.g., a positive terminal 620) of a battery cell 105 and extend through apertures 140, 145, 150 formed in each of the different layers forming the first cell holder 125, to contact a top surface of the conductive positive layer of the cell holder 125. The shape of the wirebond 605 can be selected or implemented so as not to contact a negative layer of the first cell holder 125 as the wirebond 605 extends through the different layers forming the first cell holder 125. The shape or form of the wirebond 605 can include a rectangular shape, cylindrical shape, tubular shape, spherical shape, ribbon or tape shape, curved shape, flexible or winding shape, or elongated shape. The wirebond 605 can include electrical conductive material, such as but not limited to, copper, aluminum, metal, or metallic alloy or material.

Figure 10:
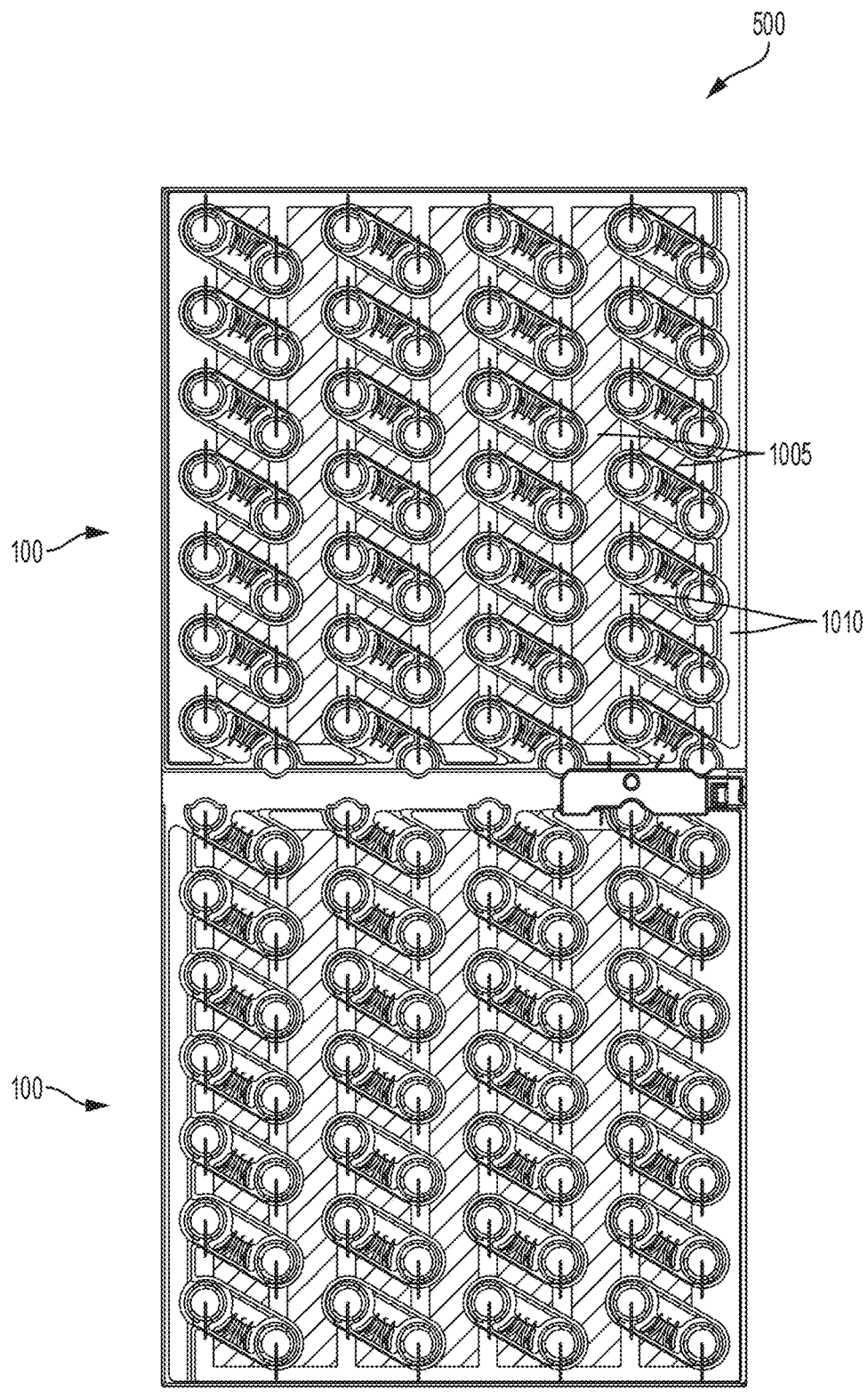
FIG. 10 depicts a top view of the battery module illustrating coated surfaces and exposed surfaces the battery blocks.

FIG. 10, among others, depicts a top view of the battery module 500 illustrating coated surfaces 1005 and exposed surfaces 1010 of the first battery block 100 and the second battery block 100. The first and second battery blocks 100 can include the multi-layered current collector having a positive current collector 110, an isolation layer 115, and a negative current collector 120. The multi-layered current collector can be laminated to protect against shorting by only exposing areas for welding, bonding or connecting to terminals of a battery cell 105. For example, each of the positive current collector 110, the isolation layer 115, and the negative current collector 120 can include apertures or cutouts to allow vent gas to escape, such as, to escape or vent from a top portion of a battery cell 105 for instance, through one or more apertures of each of the different layers (e.g., positive current collector 110, isolation layer 115, negative current collector 120). The coated surfaces 1005 can include surfaces of the respective battery blocks 100 that are laminated or coated with a laminate material or adhesive material. Surfaces of the battery blocks 100 that are not to be used for welding, bonding or connecting to terminals of battery cells 105. The exposed surfaces 1010 can correspond to surfaces of the battery blocks 100 not having any coating or laminate. The exposed surfaces 1010 can correspond to surfaces to be used for welding, bonding or connecting to terminals of battery cells 105. The coated surfaces 1005 and the exposed surface 1010 can be formed in a regular pattern across a top surface of the battery blocks 100. For example, the coated surfaces 1005 and the exposed surfaces 1010 can alternate across the top surface of the battery blocks 100 in a pattern corresponding to the arrangement of the battery cells 105 of the respective battery blocks 100. Thus, the pattern for the coated surfaces 1005 and the exposed surfaces 1010 can correspond to the arrangement of the battery cells 105 of the respective battery blocks 100.

The term weld is sometimes used herein by way of illustration (e.g., in resistive/laser welding or electrically connecting a current collector to a terminal), and is not intended to be limiting in any way to a specific manner of connection. As disclosed herein, the term weld is sometimes used interchangeably with connect or bond (e.g., wirebond 605). For example, the wirebond 605 can include a first end that is welded, connected, or bonded with a surface of a battery cell 105 and a second end that is welded, connected, or bonded with a conductive positive layer 110 of the cell holder 125. The negative tab 205 can include a first end that is welded, connected, or bonded with a surface of at least two battery cells 105 and a second end that is welded, connected, or bonded with a conductive negative layer 120 of the first cell holder 125.

FIG. 7 depicts a cross-section view 700 of an electric vehicle 705 installed with a battery pack 740. The battery pack 740 can include a plurality of battery modules 500. The plurality of battery modules 500 can include a plurality of battery blocks 100. The battery blocks 100 can include a plurality of cylindrical battery cells 105. Each of the plurality of cylindrical battery cells 105 can include a positive terminal 620 coupled with a first current collector 110 and a negative terminal 625 coupled with a second current collector 120. The electric vehicle 705 can include an autonomous, semi-autonomous, or non-autonomous human operated vehicle. The electric vehicle 705 can include a hybrid vehicle that operates from on-board electric sources and from gasoline or other power sources. The electric vehicle 705 can include automobiles, cars, trucks, passenger vehicles, industrial vehicles, motorcycles, and other transport vehicles. The electric vehicle 705 can include a chassis 710 (sometimes referred to herein as a frame, internal frame, or support structure). The chassis 710 can support various components of the electric vehicle 705. The chassis 710 can span a front portion 715 (sometimes referred to herein a hood or bonnet portion), a body portion 720, and a rear portion 725 (sometimes referred to herein as a trunk portion) of the electric vehicle 705. The front portion 715 can include the portion of the electric vehicle 705 from the front bumper to the front wheel well of the electric vehicle 705. The body portion 720 can include the portion of the electric vehicle 705 from the front wheel well to the back wheel well of the electric vehicle 705. The rear portion 725 can include the portion of the electric vehicle 705 from the back wheel well to the back bumper of the electric vehicle 705.

The battery pack 740 that includes a plurality of cylindrical battery cells 105 having a positive terminal 620 coupled with a first current collector 110 and a negative terminal 625 coupled with a second current collector 120 can be installed or placed within the electric vehicle 705. For example, the battery pack 740 can couple with a drive train unit of the electric vehicle 705. The drive train unit may include components of the electric vehicle 705 that generate or provide power to drive the wheels or move the electric vehicle 705. The drive train unit can be a component of an electric vehicle drive system. The electric vehicle drive system can transmit or provide power to different components of the electric vehicle 705. For example, the electric vehicle drive train system can transmit power from the battery pack 740 to an axle or wheels of the electric vehicle 705. The battery pack 740 can be installed on the chassis 710 of the electric vehicle 705 within the front portion 715, the body portion 720 (as depicted in FIG. 7), or the rear portion 725. A first bus-bar 735 and a second bus-bar 730 can be connected or otherwise be electrically coupled with other electrical components of the electric vehicle 705 to provide electrical power from the battery pack 740 to the other electrical components of the electric vehicle 705.

A battery pack 740 as described herein can refer to a battery system having multiple battery modules 500 (e.g., two or more). Multiple battery modules 500 can be electrically coupled with each other to form a battery pack 740, using one or more electrical connectors such as bus-bars. For example, battery blocks 100 can be electrically coupled or connected to one or more other battery blocks 100 to form a battery module 500 or battery pack 740 of a specified capacity and voltage. The number of battery blocks 100 in a single battery module 500 can vary and can be selected based at least in part on a desired capacity of the respective battery module 500. The number of battery modules 500 in a single battery pack 740 can vary and can be selected based at least in part on a desired capacity of the respective battery pack 740. For example, the number of battery modules 500 in a battery pack 740 can vary and can be selected based at least in part on an amount of energy to be provided to an electric vehicle. The battery pack 740 can couple or connect with one or more bus-bars of a drive train system of an electric vehicle to provide electrical power to other electrical components of the electric vehicle (e.g., as depicted in FIG. 7).

The battery blocks 100 and the battery modules 500 can be combinable with one or more other battery blocks 100 and battery modules 500 to form the battery pack 740 of a specified capacity and a specified voltage that is greater than that across the terminals of the battery block 100 or battery module 500. For instance, a high-torque motor may be suitably powered by a battery pack 740 formed with multiple battery cells 105 (e.g., 500 cells), blocks 100 or modules 500 connected in parallel to increase capacity and to increase current values (e.g., in Amperes or amps) that can be discharged. A battery block 100 can be formed with 20 to 50 battery cells 105 for instance, and can provide a corresponding number of times the capacity of a single battery cell 105. A battery pack 740 formed using at least some battery blocks 100 or battery modules 500 connected in parallel can provide a voltage that is greater than that across the terminals of each battery block 100 or battery module 500. A battery pack 740 can include any number of battery cells 105 by including various configurations of battery blocks 100 and battery modules 500.

The battery module 500 or battery pack 740 having one or more battery blocks 100 can provide flexibility in the design of the battery module 500 or the battery pack 740 with initially unknown space constraints and changing performance targets. For example, standardizing and using small battery blocks 100 can decrease the number of parts (e.g., as compared with using individual cells) which can decrease costs for manufacturing and assembly. The battery modules 500 or battery packs 740 having one or more battery blocks 100 as disclosed herein can provide a physically smaller, modular, stable, high capacity or high power device that is not available in today's market, and can be an ideal power source that can be packaged into various applications.

The shape and dimensions of the battery pack 740 can be selected to accommodate installation within an electric vehicle. For example, the battery pack 740 can be shaped and sized to couple with one or more bus-bars 730, 735 of a drive train system (which includes at least part of an electrical system) of an electric vehicle 705. The battery pack 740 can have a rectangular shape, square shape, or a circular shape, among other possible shapes or forms. The battery pack 740 (e.g., an enclosure or outer casing of the battery pack 740) can shaped to hold or position the battery modules 500 within a drive train system of an electric vehicle 705. For example, the battery pack 740 can be formed having a tray like shape and can include a raised edge or border region. Multiple battery modules 500 can be disposed within the battery pack 740 can be held in position by the raised edge or border region of the battery pack 740. The battery pack 740 may couple with or contact a bottom surface or a top surface of the battery modules 500. The battery pack 740 can include a plurality of connectors to couple the battery modules 500 together within the battery pack 740. The connections may include, but not limited to, straps, wires, adhesive materials, or fasteners.

The battery blocks 100 can be coupled with each other to form a battery module 500 and multiple battery modules 500 can be coupled with each other to form a battery pack 740. The number of battery blocks 100 in a single battery module 500 can vary and be selected based at least in part on a desired capacity or voltage of the respective battery module 500. The number of battery modules 500 in a single battery pack 740 can vary and be selected based at least in part on a desired capacity of the respective battery pack 740. For instance, a high-torque motor may be suitably powered by a battery pack 740 having multiple battery modules 500, the battery modules 500 having multiple battery blocks 100 and the battery blocks 100 having multiple battery cells 105. Thus, a battery pack 740 can be formed with a total number of battery cells ranging from 400 to 600 (e.g., 500 battery cells 105), with the battery blocks 100 or battery modules 500 connected in parallel to increase capacity and to increase current values (e.g., in Amperes or amps) that can be discharged. A battery block 100 can be formed with any number of battery cells 105 and can provide a corresponding number of times the capacity of a single battery cell 105.

Figure 8:
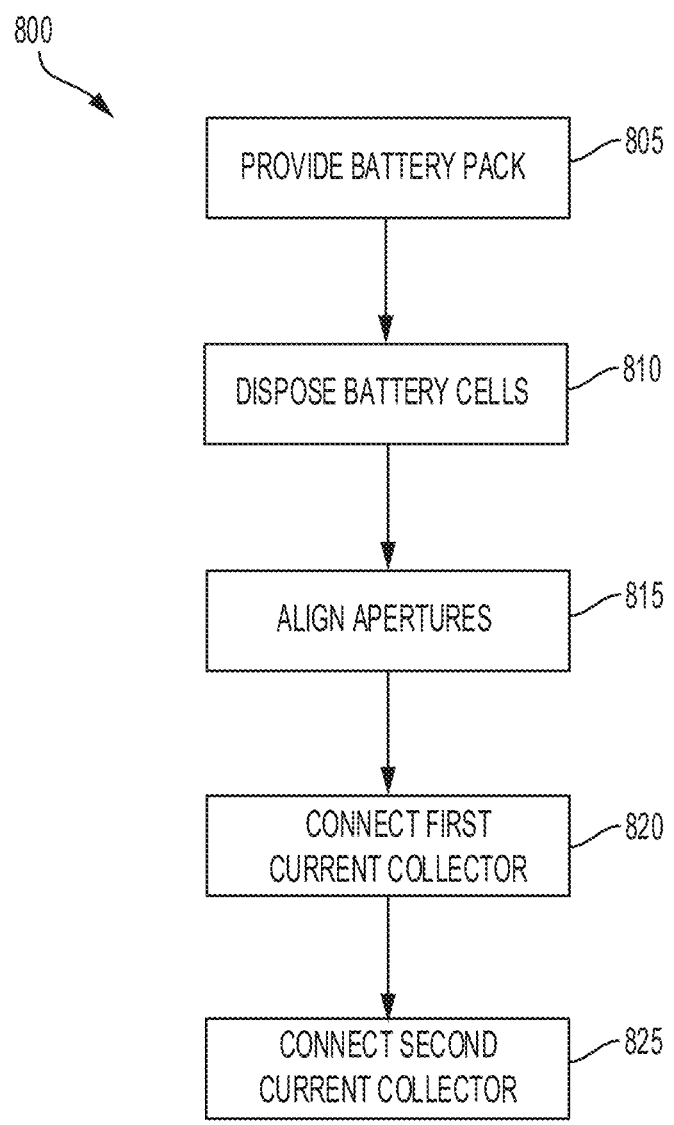
FIG. 8 is a flow diagram depicting an illustrative embodiment of a method for providing a system to power an electric vehicle.

Referring to FIG. 8, among others, an example embodiment of a method 800 of providing current collection is depicted. The method 800 can include providing a battery pack 740 (ACT 805). The battery pack 740 can be disposed within an electric vehicle 705. The battery pack 740 can be formed having multiple battery modules 500. For example, two or more battery modules 500 can be electrically coupled together to form a battery pack 740. The battery module 500 can be formed by electrically coupling two or more battery blocks 100 together. For example, battery block terminals 610, 615 can electrically couple a first battery block 100 with a second battery block 100 to form at least one battery module 500. The battery blocks 100 can be electrically coupled in series. The battery blocks 100 can be electrically coupled in parallel.

The method 800 can include disposing a plurality of cylindrical battery cells 105 within at least one battery block 100 (ACT 810). The battery cells 105 can be disposed such that they are uniformly spaced, evenly spaced within a common battery block 100 or the battery cells 105 can be disposed such that they are spaced one or more different distances from another one or more battery cells 105 of the common battery block 100. Disposing the battery cells 105 can include spacing the battery cells 105 from a neighboring or adjacent battery cell 105 in all directions by a distance that ranges from 0.5 mm to 3 mm (e.g., 1.5 mm spacing between each battery cell 105, 2 mm spacing between each battery cell 105). Disposing the battery cells 105 can include spacing one or more battery cells 105 a common battery block 100 one or more battery cells 105 one or more different distances from another one or more battery cells 105 of the common battery block 100. Depending on the shape of each battery cell 105, the battery cells 105 can be arranged spatially relative to one another to reduce overall volume of the battery block 100, to allow for minimum cell to cell spacing (e.g., without failure or degradation in performance), or to allow for an adequate number of vent ports. For example, disposing the battery cells 105 can include arranging each row of battery cells in a slanted or offset formation relative to one another. The battery cells 105 can be placed in various other formations or arrangements.

The method 800 can include aligning a plurality of apertures 140, 145, 150 (ACT 815). For example, the first conductive layer 110, the isolation layer 115, and the second conductive layer 120 can be formed having a plurality of apertures 140, 145, 150, respectively. Thus, aligning the plurality of apertures 140, 145, 150 can include aligning a first plurality of apertures 140 of a first current collector 110 having a first conductive layer. The first plurality of apertures 140 can be aligned to expose positive terminals 620 of the plurality of cylindrical battery cells 105 through the first conductive layer to connect to the first conductive layer. Aligning the plurality of apertures 140, 145, 150 can include aligning a second plurality of apertures 145 of an isolation layer 115. The second plurality of apertures 145 can be aligned to expose the positive terminals 620 of the plurality of cylindrical battery cells 105 through the isolation layer 115 to connect to the first conductive layer. The isolation layer 115 can be disposed to electrically isolate the first current collector 110 from the second current collector 120. Aligning the plurality of apertures 140, 145, 150 can include aligning a third plurality of apertures 150 of a second current collector 120 having a second conductive layer. The third plurality of apertures 150 can be aligned to expose the positive terminals of the plurality of cylindrical battery cells 105 through the second conductive layer to connect to the first conductive layer, and to expose portions of the negative terminals 625 of the plurality of cylindrical battery cells 105 to connect to the second conductive layer.

Aligning the plurality of apertures 140, 145, 150 can include exposing positive terminals of a plurality of battery cells 105 through the respective layers. The isolation layer 115 can include a nonconductive layer or non-conductive material, and can electrically isolate the first current collector 110 from the second current collector 120. The pluralities of apertures 140, 145, 150 can be aligned by maximizing areas of all or a part of the pluralities of apertures 140, 145, 150 that is unobstructed by any of the layers. The pluralities of apertures 140, 145, 150 can be aligned by aligning the boundaries of the apertures 140, 145, 150 between the layers. The pluralities of apertures 140, 145, 150 can be aligned by using a jig, setting mold or tool to align between the layers.

Portions of the first current collector 110, the isolation layer 115, and the second current collector 120 can be laminated. For example, portions of surfaces of the first current collector 110 can be coated with a laminate material. Other portions of the surfaces of the first current collector 110 can be left exposed or not coated with any laminate material. For example, surfaces of the first current collector 110 to be used for wirebonding can be left exposed to provide a contact point for the wirebonding. Surfaces not to be used for wirebonding can be coated with a laminate material.

Portions of surfaces of the isolation layer 115 can be coated with a laminate material. For example, the isolation layer 115 can be laminated to provide isolation between the first current collector 110 and the second current collector 120. The isolation layer 115 can be disposed between the first current collector 110 and the second current collector 120 with laminated surfaces in contact with the first current collector 110 and the second current collector 120. Portions of surfaces of the second current collector 120 can be coated with a laminate material. Other portions of the surfaces of the second current collector 120 can be left exposed or not coated with any laminate material. For example, surfaces of the second current collector 120 to be used for wirebonding can be left exposed to provide a contact point for the wirebonding. Surfaces not to be used for wirebonding can be coated with a laminate material.

The battery cells 105 can be aligned or arranged within the battery block 100 using a first cell holder 125 and a second cell holder 130. For example, the first cell holder 125 can hold, house or align the plurality of battery cells 105 using a fourth plurality of apertures 155. The second cell holder 130 can hold, house or align the plurality of battery cells 105 using a fifth plurality of apertures 160. The first cell holder 125 can be coupled with or include the first current collector 110, the isolation layer 115, and the second current collector 120. The battery cells 105 can be disposed such that a first end or top surface is couple with the first cell holder 125 and a second end or bottom surface is coupled with the second cell holder 130. Thus, the first cell holder 125 and the second cell holder 130 can arrange the battery cells in place.

The method 800 can include connecting the first current collector 110 with the battery cells (ACT 820). The first current collector 110 can correspond to a first conductive layer or positive conductive layer and can be electrically coupled with the positive terminals of the plurality of battery cells 105. The first current collector 110 can be coupled with or connected to the positive terminal of each of the plurality of cylindrical battery cells 105 via welding (e.g., laser welding) or wire bonding. For example, a wirebond 605 can couple each battery cell 105 with a surface or portion of the first current collector 110. The wirebond 605 can be positioned such that it extends through one or more of the apertures 140, 145, 150 to contact a positive terminal of a battery cell 105 and the surface or portion of the first current collector 110. For example, a wirebonding tool can attach or connect a bondhead or end of a wirebond 605 to or near a center of a positive terminal of the battery cell 105, and another bondhead or end of the wirebond 605 to an uncoated or uninsulated surface of the first current collector 110. A wirebonding tool can access the positive terminal of the battery cell 105 exposed by one or more of the apertures 140, 145, 150, and can connect one end of a wirebond to the positive terminal. The wirebonding tool can connect another end of the wirebond to a surface of an uncoated or uninsulated surface of the first current collector 110.

The method 800 can include connecting the second current collector 120 with the battery cells (ACT 825). The second current collector 120 can correspond to a second conductive layer or negative conductive layer, and can be electrically coupled with a rim 135 of each of the plurality of battery cells 105. The rims 135 can correspond to negative terminals of the plurality of battery cells 105. The rims 135 of at least two battery cells 105 can be aligned or positioned within a battery block 100 such that a negative tab 205 of the second current collector 120 couples with or contacts with the rims 135 of at least two battery cells 105.

The second current collector 120 can be connected to the rim 135 of each of the plurality of battery cells 105 via welding (e.g., laser welding) or wire bonding. For example, the negative tab 205 of the second current collector 120 can be welded or wire bonded to rims 135 of a battery cell 105 or two battery cells 105. Each of the positive terminals can be located at a same end of a corresponding battery cell 105 as a connected rim 135 of the corresponding battery cell 105. A wirebonding tool can access a rim 135 of a battery cell 105 exposed by one or more of the apertures 140, 145, 150, and can connect one end of a wirebond to the rim 135. The wirebonding tool can access a negative tab 205 or other portion of the second current collector 120, and can connect another end of the wirebond to a surface of the negative tab 205 or other portion of the second current collector 120. The isolation layer 115, comprising a lamination layer, can hold or bind the first current collector 110 and the second current collector 120 together. For example, the isolation layer 115 may include a laminate material or adhesive material disposed over a first surface or a second surface of the isolation layer 115 such that the first current conductor 110 can be coupled with or adhered to the first surface of the isolation layer 115 and the second current collector 120 can be coupled with or adhered to the second surface of the isolation layer 115.

Aperture edges of at least a portion of the plurality of apertures 140, 145, 150 of the first current collector 110 or the second current collector 120 can be electrically isolated from the positive terminals of the plurality of battery cells 105. For example, method 800 can include coating the inner surface, edge, or inner rim of the apertures 140, 145, 150 with a insulation layer or material to electrically insulate or electrically isolate a wirebond (e.g., positive wirebond) disposed in or extending through one or more of the apertures 140, 145, 150, from the first current collector 110 or the second current collector 120.

A first aperture 150 of the second current collector's 120 plurality of apertures 150 can be created to have an area smaller than that of a corresponding aperture 140 of the first current collector 110 or a corresponding aperture 145 of the isolation layer 115. The first aperture 150 of the second current collector 120 can be formed having an area smaller than that of the corresponding aperture of the first current collector 110 or a corresponding aperture 145 of the isolation layer 115 due to a negative tab 205 coupled with or formed with an edge of the first aperture 150 of the second current collector 120. For example, the second current collector 120 can be formed having a tabbed portion, referred to herein as a negative tab 205, that extends or protrudes towards a center of the respective aperture 150 of the plurality of apertures 150 of the second current collector 120. Each of the apertures the plurality of apertures 150 of the second current collector 120 may include at least one negative tab 205.

The negative tab 205 can extend or protrude such that it is the same plane a surface of the second current collector 120 and thus a top or bottom surface of the negative tab 205 can be parallel with a top or bottom surface of the second current collector 120. The negative tab 205 can be welded (e.g., laser welded) or bonded (e.g., wire bonded) to at least one negative terminal of a cylindrical battery cell 105. A single negative tab 205 may be welded or bonded to two negative terminals of two different negative terminals of two different cylindrical battery cells 105. For example, portions (e.g., separate portions) of the negative tab 205 can be welded or bonded to negative terminals of two cylindrical battery cell 105. Other portions or edges of the first aperture can be welded or bonded to at least one negative terminal of a cylindrical battery cell 105.

The positive terminals of the cylindrical battery cells 105 can be exposed through one or more of the apertures 140, 145, 150 formed in the first current collector 110, the isolation layer 115, and the second current collector 120, respectively. For example, two battery cells 105 (e.g., a first battery cell 105 and a second batter cell 105) can be exposed through a first region 210 and a second region 215 of one or more of the apertures 140, 145, 150 formed in the first current collector 110, the isolation layer 115, and the second current collector 120, respectively.

A wirebond 605 can couple the positive terminals of the cylindrical battery cells 105 with the first current collector 110. For example. A first wirebond 605 can couple the positive terminal of the first battery cell 105 with the first current collector 110 and a second wirebond 605 can couple the positive terminal of the second battery cells 105 with the first current collector 110. The first and second wirebonds 605 can extend through the apertures 140, 145, 150 to couple with a surface of the first current collector 110. The first and second wirebonds 605 can be welded (e.g., laser welded) or bonded (e.g., wire bonded) to the positive terminals of the first and second cylindrical battery cells 105, respectively.

At least one edge of the first current collector 110 or the second current collector 120 can be formed to have at least one partially-formed aperture to expose at least one positive terminal of the plurality of cylindrical battery cells 105 through a corresponding layer. The partially formed apertures can be formed to allow a wirebond 650 to couple with the positive terminals of the plurality of cylindrical battery cells 105. The dimensions of the partially formed apertures can vary and can be selected based at least in part on the dimensions of the battery cells 105.

Figure 9:
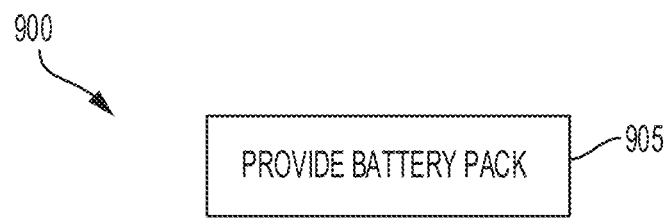
FIG. 9 is a flow diagram depicting an example method for providing a system to power an electric vehicle.

FIG. 9 depicts an example embodiment of a method 900 of providing a system to power an electric vehicle 705. The method 900 can include providing a battery pack 740 (ACT 905). For example, the system to power an electric vehicle 705 can include a battery pack 740. The battery pack 740 can reside in the electric vehicle 705 and can include a plurality of battery modules 500. Each of the plurality of battery modules 500 can include a plurality of battery blocks 100. A first battery block 100 of the plurality of battery blocks 100 can include a pair of battery block terminals 610, 615. The first battery block 100 can include a plurality of cylindrical battery cells 105. Each of the plurality of cylindrical battery cells 105 can include a positive terminal 620 and a negative terminal 625. A first current collector 110 can include a conductive layer. The conductive layer of the first current collector 110 can couple the first current collector 110 with positive terminals 620 of the plurality of cylindrical battery cells 105 at first ends of the plurality of cylindrical battery cells 105. A second current collector 120 can include a conductive layer. The conductive layer of the second current collector 120 can be electrically isolated from the conductive layer of the first current collector 110 by an isolation layer 115. The conductive layer of the second current collector 120 can couple the second current collector 120 with negative terminals 625 of the plurality of cylindrical battery cells 105 at the first ends of the plurality of cylindrical battery cells 105. The first current collector 110 can include a plurality of apertures 140 to expose the positive terminals 620 of the plurality of cylindrical battery cells to couple with the conductive layer of the first current collector 110. The isolation layer 115 can include a plurality of apertures 145 to expose the positive terminals 620 of the plurality of cylindrical battery cells 105. The positive terminals 625 (or wirebonds 605) of the plurality of cylindrical battery cells 105 can extend through the plurality of apertures 145 of the isolation layer 115 to couple with the conductive layer of the first current collector 110. The second current collector 120 can have a plurality of apertures 150 to expose the positive terminals 620 of the plurality of cylindrical battery cells 105 and to expose portions of the negative terminals 625 of the plurality of cylindrical battery cells 105 to connect to the conductive layer of the second current collector 120. The positive terminals 620 (or wirebonds 605) of the plurality of cylindrical battery cells 105 can extend through the plurality of apertures 150 of the second current collector 120 to couple with the conductive layer of the first current collector 110.

While acts or operations may be depicted in the drawings or described in a particular order, such operations are not required to be performed in the particular order shown or described, or in sequential order, and all depicted or described operations are not required to be performed. Actions described herein can be performed in different orders.

Having now described some illustrative implementations, it is apparent that the foregoing is illustrative and not limiting, having been presented by way of example. Features that are described herein in the context of separate implementations can also be implemented in combination in a single embodiment or implementation. Features that are described in the context of a single implementation can also be implemented in multiple implementations separately or in various sub-combinations. References to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any act or element may include implementations where the act or element is based at least in part on any act or element.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A'" and 'B' can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. For example the voltage across terminals of battery cells can be greater than 5V. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An electric vehicle, comprising:
a battery pack to power the electric vehicle, the battery pack residing in the electric vehicle and comprising a plurality of battery modules;
each of the plurality of battery modules comprising a plurality of battery blocks;
a first battery block of the plurality of battery blocks having a pair of battery block terminals, the first battery block comprising a plurality of cylindrical battery cells;
each of the plurality of cylindrical battery cells having a positive terminal and a negative terminal;
a first current collector having a conductive layer, the conductive layer of the first current collector coupling the first current collector with the positive terminals of the plurality of cylindrical battery cells at first ends of the plurality of cylindrical battery cells;
a second current collector having a conductive layer, the conductive layer of the second current collector electrically isolated from the conductive layer of the first current collector by an isolation layer, the conductive layer of the second current collector coupling the second current collector with the negative terminals of the plurality of cylindrical battery cells at the first ends of the plurality of cylindrical battery cells;
the first current collector having a plurality of apertures to expose the positive terminals of the plurality of cylindrical battery cells to couple with the conductive layer of the first current collector;
the isolation layer having a plurality of apertures to expose the positive terminals of the plurality of cylindrical battery cells, the positive terminals of the plurality of cylindrical battery cells extend through the plurality of apertures of the isolation layer to couple with the conductive layer of the first current collector;
the second current collector having a plurality of apertures to expose the positive terminals of the plurality of cylindrical battery cells and to expose portions of the negative terminals of the plurality of cylindrical battery cells to connect to the conductive layer of the second current collector;
the positive terminals of the plurality of cylindrical battery cells extend through the plurality of apertures of the second current collector to couple with the conductive layer of the first current collector; and
a plurality of wirebonds that respectively couple the first current collector with the positive terminals of the plurality of cylindrical battery cells.

2. The electric vehicle of claim 1, wherein:
the first current collector is welded with the positive terminals of the plurality of cylindrical battery cells.

3. The electric vehicle of claim 1, wherein:
the isolation layer includes a lamination layer to hold the first current collector and the second current collector together.

4. The electric vehicle of claim 1, wherein:
at least a portion of the plurality of apertures of the second current collector have aperture edges that are electrically isolated from the positive terminals of the plurality of cylindrical battery cells.

5. The electric vehicle of claim 1, wherein:
each aperture of the plurality of apertures of the second current collector has an area smaller than an area of each aperture of the plurality of apertures of the first current collector.

6. The electric vehicle of claim 1, wherein:
each aperture of the plurality of apertures of the second current collector has an area smaller than an area of each aperture of the plurality of apertures of the first current collector due to a protruding edge protruding towards a center of each aperture of the plurality of apertures of the second current collector.

* * * * *